(12) United States Patent
Lee et al.

(10) Patent No.: US 9,717,004 B2
(45) Date of Patent: Jul. 25, 2017

(54) APPARATUS AND METHOD FOR SPONSORED CONNECTIVITY TO WIRELESS NETWORKS USING APPLICATION-SPECIFIC NETWORK ACCESS CREDENTIALS

(71) Applicant: QUALCOMM Incorporated, San Diego, CA (US)

(72) Inventors: Soo Bum Lee, San Diego, CA (US); Anand Palanigounder, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 14/829,432

(22) Filed: Aug. 18, 2015

(65) Prior Publication Data

US 2016/0277927 A1   Sep. 22, 2016

Related U.S. Application Data

(60) Provisional application No. 62/134,206, filed on Mar. 17, 2015.

(51) Int. Cl.
*H04L 29/00* (2006.01)
*H04W 12/06* (2009.01)
(Continued)

(52) U.S. Cl.
CPC .......... *H04W 12/06* (2013.01); *H04L 63/126* (2013.01); *H04L 67/16* (2013.01); *H04W 76/021* (2013.01); *H04W 4/20* (2013.01); *H04W 60/00* (2013.01)

(58) Field of Classification Search
CPC .......... H04L 63/08; H04L 63/06; H04L 9/00; H04W 12/06
See application file for complete search history.

(56) References Cited

U.S. PATENT DOCUMENTS

| 8,724,819 B2 | 5/2014 | Asokan et al. |
| 8,849,978 B1 | 9/2014 | Batson et al. |
(Continued)

FOREIGN PATENT DOCUMENTS

EP     2424192 A2    2/2012

OTHER PUBLICATIONS

International Search Report and Written Opinion—PCT/US2016/020224—ISA/EPO—Aug. 8, 2016.

*Primary Examiner* — Izunna Okeke
(74) *Attorney, Agent, or Firm* — Loza & Loza, LLP

(57) ABSTRACT

At least one feature pertains to a method operational at a user device. The method includes receiving and storing a shared key from an application service provider, and determining that a wireless communication network provides application-specific access to an application service provided by the application service provider. The method further includes transmitting a registration request that includes a device identifier and an application identifier associated with the application service to the wireless communication network. The registration request is transmitted to the application service provider using a data connection through a packet data network. The method further includes receiving authentication information derived at the application service provider that is based on the shared key, and performing authentication and key agreement with the network based on the authentication information and the stored shared key.

(Continued)

The user device may then communicate with the application service after authentication and key agreement is successfully performed.

44 Claims, 21 Drawing Sheets

(51) Int. Cl.
*H04L 29/08* (2006.01)
*H04L 29/06* (2006.01)
*H04W 76/02* (2009.01)
*H04W 4/20* (2009.01)
*H04W 60/00* (2009.01)

(56) References Cited

U.S. PATENT DOCUMENTS

| | | |
|---|---|---|
| 8,874,074 B2 | 10/2014 | Bacareza et al. |
| 2005/0102501 A1* | 5/2005 | Haukka .................. H04L 29/06 713/155 |
| 2005/0287990 A1 | 12/2005 | Mononen et al. |
| 2009/0245184 A1 | 10/2009 | Torres et al. |
| 2010/0011220 A1* | 1/2010 | Zhao .................... H04L 9/0844 713/182 |
| 2012/0317261 A1 | 12/2012 | Ahmavaara |
| 2013/0340053 A1 | 12/2013 | McCoy et al. |
| 2014/0295815 A1 | 10/2014 | Cho et al. |
| 2016/0277191 A1 | 9/2016 | Lee et al. |

* cited by examiner

APPARATUS AND METHOD FOR SPONSORED CONNECTIVITY TO WIRELESS NETWORKS USING APPLICATION-SPECIFIC NETWORK ACCESS CREDENTIALS

CLAIM OF PRIORITY

The present application for patent claims priority to provisional application No. 62/134,206 entitled "Apparatus and Method for Sponsored Connectivity to Wireless Networks Using Application-Specific Network Access Credentials" filed Mar. 17, 2015, the entire disclosure of which is hereby expressly incorporated by reference.

BACKGROUND

Field

The present invention relates generally to establishing a data connection between a user equipment and a wireless network.

Background

Generally, access to a wireless cellular system by a user device is based on a pre-arranged subscriber format. Access is typically not afforded to user devices who are not subscribers of the wireless cellular system or do not have the benefit of an existing relationship with the wireless cellular system.

However, an application service provider may want a user device to have access to its servers and services through the wireless cellular system notwithstanding the absence of a subscription for the wireless cellular system by the user device. The application service provider may be willing to compensate the wireless cellular system on behalf of the user device for this access. Such "sponsored connectivity" may allow the user device to utilize the wireless cellular network on a limited basis in order to connect to servers of the application service provider for a specific application, and the application service provider is charged for the access.

Existing solutions for sponsored connectivity include access point name (APN) based forwarding where a bearer is set up based on an APN configured in a subscriber identity module (SIM) provisioned by a sponsor, generic bootstrapping architecture only available to current subscribers equipped with SIM capability, and application based forwarding where traffic is filtered based on internet protocol (IP) addresses.

However, problems exist with the aforementioned existing solutions, For example, the user device may not be equipped with the operator's (e.g., wireless cellular system) credentials. For instance, the user device may lack a SIM or may not have a cellular subscription. In the case where IP address based filtering is used, sponsored. connectivity may not be easily scaled for many different sponsors (e.g., application service providers), unauthorized/unauthenticated traffic may flow through the operator's core network, the service access network (e.g., gateways) may be prone to an overload attack, the application service provider may be charged for non-service related traffic (e.g., traffic caused by an attack), and no "first-mile" (e.g., access through evolved node B (eNB) and/or mobility management entity (MME)) defense (i.e., filtering) may be available.

Therefore, there is a need for improved methods, apparatuses, and systems for establishing sponsored connectivity that allow user devices to access an application service provider through a wireless network for which the user devices lack subscriptions.

SUMMARY

One feature provides a method operational at a user device, the method comprising receiving and storing a shared key from an application service provider, determining that a wireless communication network provides application-specific access to an application service provided by the application service provider, transmitting a registration request that includes a device identifier and an application identifier associated with the application service to the wireless communication network, the registration request adapted for transmission to the application service provider using a data connection through a packet data network, receiving, from the wireless communication network, authentication information derived at the application service provider that is based in part on the shared key, performing authentication and key agreement with the wireless communication network based on the authentication information and the stored shared key, and communicating with the application service after authentication and key agreement is successfully performed. According to one aspect, the shared key is uniquely associated with the user device. According to another aspect, the shared key is received from the application service provider over a secure connection.

According to one aspect, the method further comprises enabling communication between the user device and a set of application services allowed by the application service provider after authentication and key agreement is successfully performed. According to another aspect, the method further comprises receiving and storing the device identifier from the application service provider before transmitting the registration request. According to yet another aspect, the method further comprises receiving the application identifier from the application service provider before transmitting the registration request to the wireless communication network, According to one aspect, the method further comprises receiving the application identifier from the wireless communication network via an application service announcement before transmitting the registration request to the wireless communication network. According to another aspect, the application identifier is at least one of a fully qualified domain name, a uniform resource locator, and/or a uniform resource identifier. According to one aspect, application-specific access is granted to the user device independent to any subscriber identity module associated with the user device.

Another feature provides a user device comprising a wireless communication interface adapted to wirelessly communicate with a wireless communication network, a memory circuit, and a processing circuit communicatively coupled to the memory circuit and the wireless communication interface, the processing circuit adapted to receive a shared key from an application service provider, store the shared key at the memory circuit, determine that the wireless communication network provides application-specific access to an application service provided by the application service provider, transmit a registration request that includes a device identifier and an application identifier associated with the application service to the wireless communication network, the registration request adapted for transmission to the application service provider using a data connection through a packet data network, receive, from the wireless communication network, authentication information derived at the application service provider that is based in part on the shared key, perform authentication and key agreement with the wireless communication network based on the authentication information and the stored shared key, and communicate with the application service after authentication and key agreement is successfully performed. According to one aspect, the processing circuit is further adapted to receive the device identifier from the application service provider before transmitting the registration request. According to another aspect, the processing circuit is further adapted to receive the application identifier from the application service provider before transmitting the registration request to the wireless communication network.

According to one aspect, the processing circuit is further adapted to enable communication between the user device and a set of application services allowed by the application service provider after authentication and key agreement is successfully performed. According to another aspect, the processing circuit is further adapted to receive the application identifier from the wireless communication network via an application service announcement before transmitting the registration request to the wireless communication network.

Another feature provides a user device comprising means for receiving and storing a shared key from an application service provider, means for determining that a wireless communication network provides application-specific access to an application service provided by the application service provider, means for transmitting a registration request that includes a device identifier and an application identifier associated with the application service to the wireless communication network, the registration request adapted for transmission to the application service provider using a data connection through a packet data network, means for receiving, from the wireless communication network, authentication information derived at the application service provider that is based in part on the shared key, means for performing authentication and key agreement with the wireless communication network based on the authentication information and the stored shared key, and means for communicating with the application service after authentication and key agreement is successfully performed. According to one aspect, the user device further comprises means for receiving the application identifier from the application service provider before transmitting the registration request to the wireless communication network. According to another aspect, the user device further comprises means for receiving the application identifier from the wireless communication network via an application service announcement before transmitting the registration request to the wireless communication network.

Another feature provides a method operational at a wireless communication network device associated with a wireless communication network, the method comprising receiving, from a user device, a registration request for application-specific access to an application service provided by an application service provider, the registration request including a device identifier identifying the user device and an application identifier identifying the application service, transmitting an authentication information request including the registration request and a serving network identifier identifying the wireless communication network to the application service provider using a data connection through a packet data network, receiving authentication information from the application service provider in response to transmitting the authentication information request, the authentication information based in part on a shared key associated with the user device, and performing authentication and key agreement with the user device based on the authentication information. According to one aspect, the method further comprises receiving application service registration information associated with the application service before receiving the registration request from the user device. According to another aspect, the application service registration information is received from the application service provider via a service provisioning function.

According to one aspect, the application service registration information includes at least one of the application identifier and/or application service class indicating a quality of service the wireless communication network provides for communications between the user device and the application service. According to another aspect, the method further comprises broadcasting an announcement that indicates availability of application-specific access to the application service through the wireless communication network. According to yet another aspect, the announcement includes the application identifier.

According to one aspect, the authentication information includes an authentication vector comprising a key access security management entity (K_ASME), an authentication token (AUTN), a random number (RAND), and an expected response (XRES), and performing authentication and key agreement with the user device based on the authentication information includes storing K_ASME and XRES at the wireless communication network device, transmitting RAND and AUTN to the user device, receiving a response value (RES) from the user device, and verifying that RES equals XRES to authenticate the user device. According to another aspect, the method further comprises providing application-specific access to the user device for the application service after authentication and key agreement is successful. According to yet another aspect, the method further comprises enabling communication between the user device and a set of application services allowed by the application service provider after authentication and key agreement is successful.

Another feature provides a wireless communication network device associated with a wireless communication network, the wireless communication network device comprising a wireless communication interface adapted to wirelessly communicate with at least a user device, and a processing circuit communicatively coupled to the wireless communication interface, the processing circuit adapted to receive, from the user device, a registration request for application-specific access to an application service provided by an application service provider, the registration request including a device identifier identifying the user device and an application identifier identifying the application service, transmit an authentication information request including the registration request and a serving network identifier identifying the wireless communication network to the application service provider using a data connection through a packet data network, receive authentication information from the application service provider in response to transmitting the authentication information request, the authentication information based in part on a shared key associated with the user device, and perform authentication and key agreement with the user device based on the authentication information. According to one aspect, the processing circuit is further adapted to receive application service registration information associated with the application service before receiving the registration request from the user device. According to another aspect, the processing circuit is further adapted to broadcast an announcement that indicates availability of application-specific access to the application service through the wireless communication network.

According to one aspect, the authentication information includes an authentication vector comprising a key access security management entity (K_ASME), an authentication token (AUTN), a random number (RAND), and an expected response (XRES), and the processing circuit adapted to perform authentication and key agreement with the user device based on the authentication information includes the processing circuit further adapted to store K_ASME and XRES at the wireless communication network device, transmit RAND and AUTN to the user device, receive a response value (RES) from the user device, and verify that RES equals XRES to authenticate the user device. According to another aspect, the processing circuit is further adapted to provide application-specific access to the user device for the application service after authentication and key agreement is successful. According to yet another aspect, the processing circuit is further adapted to enable communication between the user device and a set of application services allowed by the application service provider after authentication and key agreement is successful.

Another feature provides a wireless communication network device associated with a wireless communication network, the wireless communication network device comprising means for receiving, from a user device, a registration request for application-specific access to an application service provided by an application service provider, the registration request including a device identifier identifying the user device and an application identifier identifying the application service, means for transmitting an authentication information request including the registration request and a serving network identifier identifying the wireless communication network to the application service provider using a data connection through a packet data network, means for receiving authentication information from the application service provider in response to transmitting the authentication information request, the authentication information based in part on a shared key associated with the user device, and means for performing authentication and key agreement with the user device based on the authentication information. According to one aspect, the wireless communication network device further comprises receiving application service registration information associated with the application service before receiving the registration request from the user device. According to another aspect, the wireless communication network device further comprises broadcasting an announcement that indicates availability of application-specific access to the application service through the wireless communication network. According to yet another aspect, the wireless communication network device further comprises enabling communication between the user device and a set of application services allowed by the application service provider after authentication and key agreement is successful.

DETAILED DESCRIPTION

In the following description, specific details are given to provide a thorough understanding of the various aspects of the disclosure. However, it will be understood. by one of ordinary skill in the art that the aspects may he practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration," Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. As used herein, the term "application service" refers to an application and/or service provided by and/or allowed access to by an application service provider. The term "application service provider" refers to an entity that provides an application service.

Figure 1:
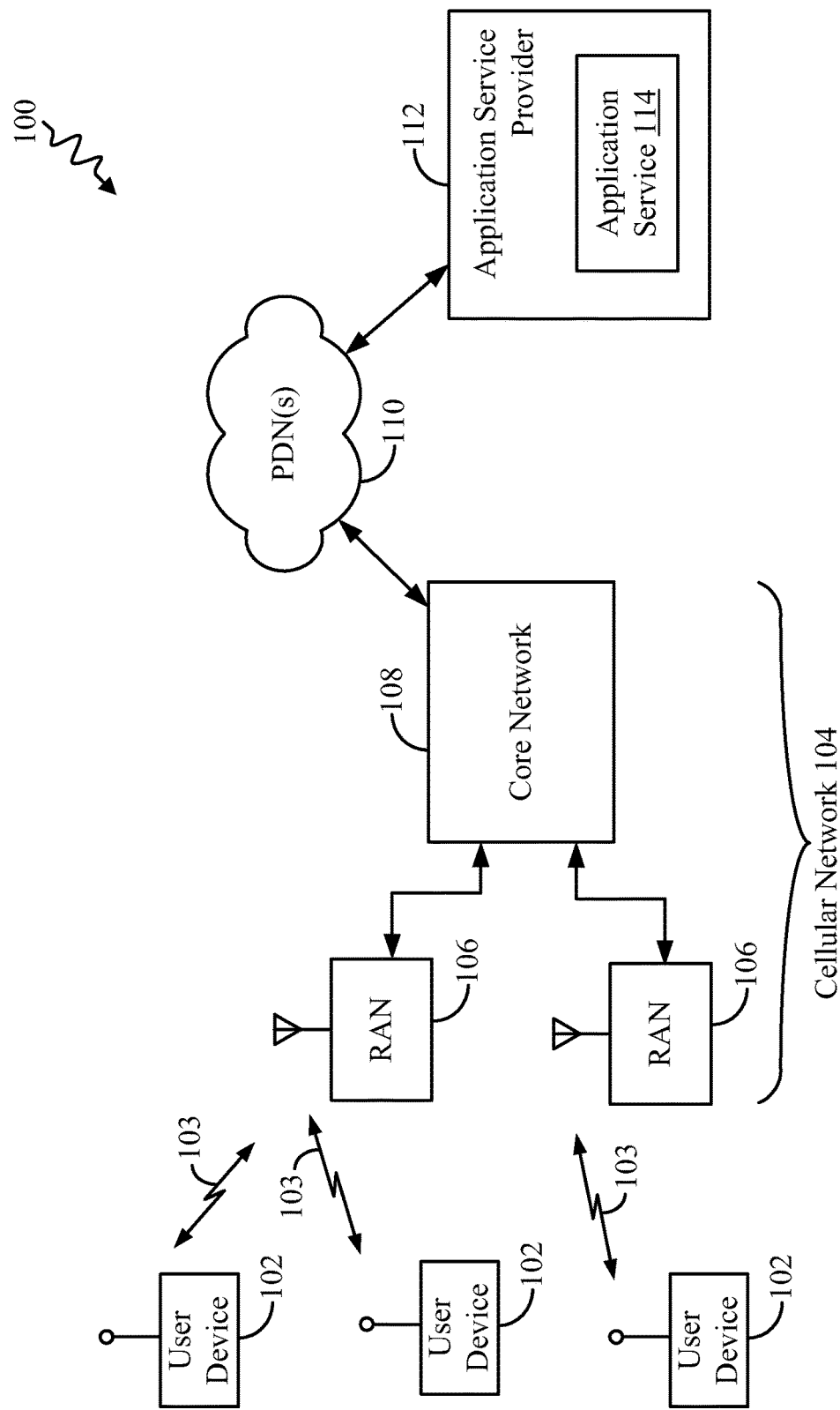
FIG. 1 illustrates a high-level schematic diagram of a communication system featuring sponsored connectivity (i.e., "application-specific access") for one or more application services.

FIG. 1 illustrates a high-level schematic diagram of a communication system 100 featuring sponsored connectivity (i.e., "application-specific access") for one or more application services according to one aspect of the disclosure. The system includes a plurality of user devices 102

(e.g., user equipment (UE)) that are in wireless communication 103 with a wireless communication network 104 (e.g., wireless cellular network). The wireless communication network 104 may include one or more radio access networks 106 and a core network 108. The plurality of user devices 102 may access (i.e., communicate with) an application service provider 112 through the wireless communication network 104 and any other packet data networks (PDNs) 110 (e.g., interact, instant messaging services (IMS), etc.) there between. For instance, the plurality of devices 102 may desire access to one or more application services 114 provided by (e.g., hosted by) and/or allowed access to by the application service provider 112. For example, the application service 114 may be software provided by the application service provider 112. As another example, the application service 114 may allow the user devices 102 to access other applications, data, websites, and/or services not provided/owned by the application service provider 114. In this sense the application service 112 may allow the user devices 102 to access a general data connection too in some cases.

According to one aspect, the user devices 102 are wireless communication devices such as, but not limited to, mobile phones, smartphones, laptops, personal digital assistants (PDAs), tablets, computers, smartwatches, and head-mounted wearable computers (e.g., Google Glass®). According to one aspect, the cellular network 104 may be any wireless network including but not limited to the Global System for Mobile Communications (GSM) network, Universal Mobile Telecommunications System (UMTS) network, the long term evolution (LTE) network, and any other wireless communication network. According to one aspect, the application service 114 may be any electronic application and/or service such as, but not limited to, a website, software, program, a database, etc. that is provided, hosted and/or otherwise managed by the application service provider 112. One or more servers or other hardware devices may comprise the application service provider 112 to facilitate the operation of the application service 114. Although only one application service 114 is shown, the application service provider 114 may provide a plurality of different application services (e.g., a set of services), Similarly, although only one application service provider 112 is shown, there may a plurality of different application service providers each providing one or more application services that may be available through application-specific access through the wireless communication network 104.

The user devices 102 may not have a subscription or any existing relationship with the wireless communication network 104. Thus, ordinarily the user devices 102 may not be able to use the wireless communication network 104 to generally send or receive data. However, given pre-negotiated arrangements and agreements between the application service provider 112 and the wireless communication network's 104 operator, the wireless communication network 104 may allow the user devices 102 to access the application service provider 112 and/or its application service 114 using the network 104 and charge at least a portion, if not all, of the fees, if any, for such usage to the application service provider 114. In this sense the application service provider 112 sponsors the user devices' usage of the wireless communication network 104 and the user devices 102 therefore have sponsored connectivity to the application service provider 112 and/or application service 114.

Figure 2:
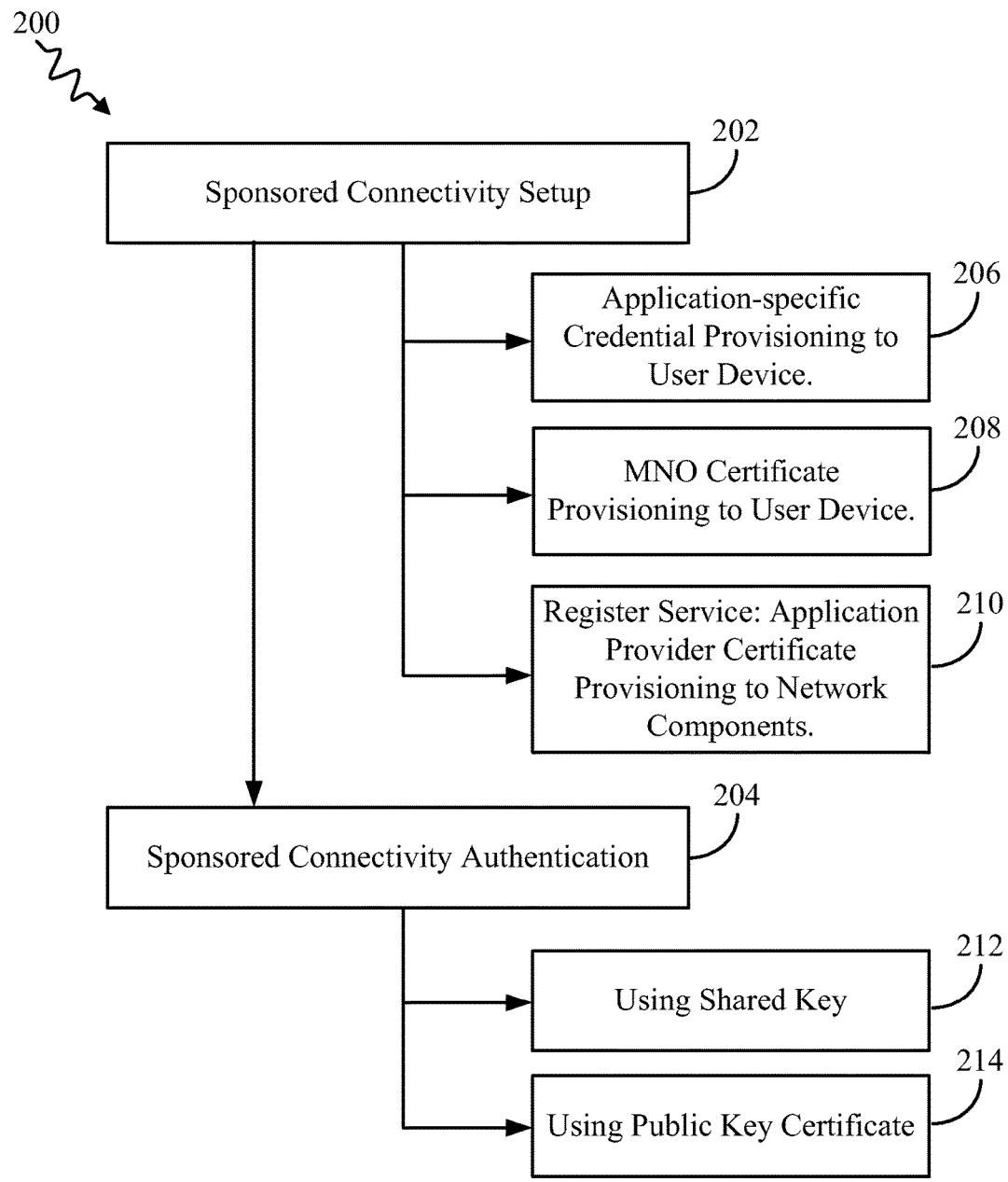
FIG. 2 illustrates a high-level flow chart for providing sponsored connectivity using application-specific credentials.

FIG. 2 illustrates a high-level flow chart 200 for providing sponsored connectivity using application-specific credentials according to one aspect of the disclosure. Generally, the process for providing a user device sponsored connectivity to a wireless network includes setup 202 (e.g., setup phase) and authentication 204 (e.g., authentication phase).

During setup 202, a user device may be provisioned with an application-specific credential 206 by the application service provider. The application-specific credential allows the user device to be authenticated for application-specific access to an application service provided by the application service provider through the wireless communication network. The application-specific credential may be supplied in a secure manner such as, but not limited to, encrypting the credential using the user device's public key (if any and/or using a Secure Sockets Layer (SSL) or Transport Layer Security (TLS) cryptographic protocol. The application-specific credential may be based on a shared key (e.g., symmetric key), a user device public key certificate, and/or a combination of the two. For example, in one aspect the application-specific credential may be a shared key provided to the user device and also stored at the application service provider. As another example, the application-specific credential may be an application-specific certificate that includes an application-specific digital signature. The application--specific credential may be stored in a secure execution environment or trusted execution environment of the user device. One non-limiting, non-exclusive example of a secure execution environment is TrustZone® in the ARM® architecture.

Also during setup 202, the user device may be provisioned 208 with a plurality of certificates associated with trusted wireless communication networks. For example, the plurality of certificates may be a list of trusted mobile network operators' (MNO) certificates. The application service provider may also perform service provisioning 210 that includes registering an application service with a service provisioning function (SPF) that may be part of the wireless communication network. The SPF may in turn provision 210 one or more wireless communication network devices (e.g., RAN, MME, etc.) with the application service provider's public key in the case where the application-specific credential is the application-specific certificate. According to one example, the application service provider's public key may be provided to the network devices by itself. As another example, it may be provided in the form of a certificate: either self-signed certificate (i.e., application service provider public key certificate signed by the application service provider) or third party signed certificate.

After setup 202, authentication 204 and key agreement may be performed based on whether the application-specific credential used is a shared key 212 or a public key certificate 214. In the case where the application-specific credential is a shared key 212, the application service provider acts as a home subscriber service (HSS) authentication, authorization and accounting (AAA) entity. The shared key is kept secret and may be pre-shared between the user device and the application service provider via an out of band communication channel (e.g., Wi-Fi®) that is different from the main communication channel (e.g., data path shown in FIG. 4) between the user device and the application service provider. In one aspect, a data connection (e.g., data communication channel via the Internet) is established between the wireless communication network device(s) (e.g., MME) and the application service provider since the MME and the application service provider may not have a direct signaling channel (e.g., control channel) between one other. At first, the data connection may be used only to forward an authentication information request to the application service provider in order to authenticate the user device (e.g., successfully perform authentication and key agreement). Only once the user device is authenticated may the user device also transmit data traffic to the application service provider through the data connection and/or another data connection. Moreover, application-specific traffic/mobility handling (e.g., bearer pre-configuration) to the application server may be configured.

In the case where the application-specific credential is the application-specific certificate, the wireless communication network may authenticate the user device attempting to gain sponsored connectivity through the network by verifying the application-specific digital signature contained within the application-specific certificate. Network access authentication is performed within the wireless network without having to contact the application service provider. That is, the network access authentication may be performed between the wireless communication network and the user device independent to the application service provider (i.e., without having to contact the application service provider for authentication). Thus, application-specific authentication and filtering in such a case can be enforced in the "first mile" (e.g., enforced by an RAN and/or MME). Similarly, the user device may use the plurality of certificates associated with the trusted wireless communication networks it was provisioned with to authenticate the specific wireless communication network with which it is attempting to establish sponsored connectivity for an application service. Specifically, the user device may use these certificates to verify one or more digital signatures included in announcements (e.g., application service announcements) broadcast by the wireless communication network.

Figure 3:
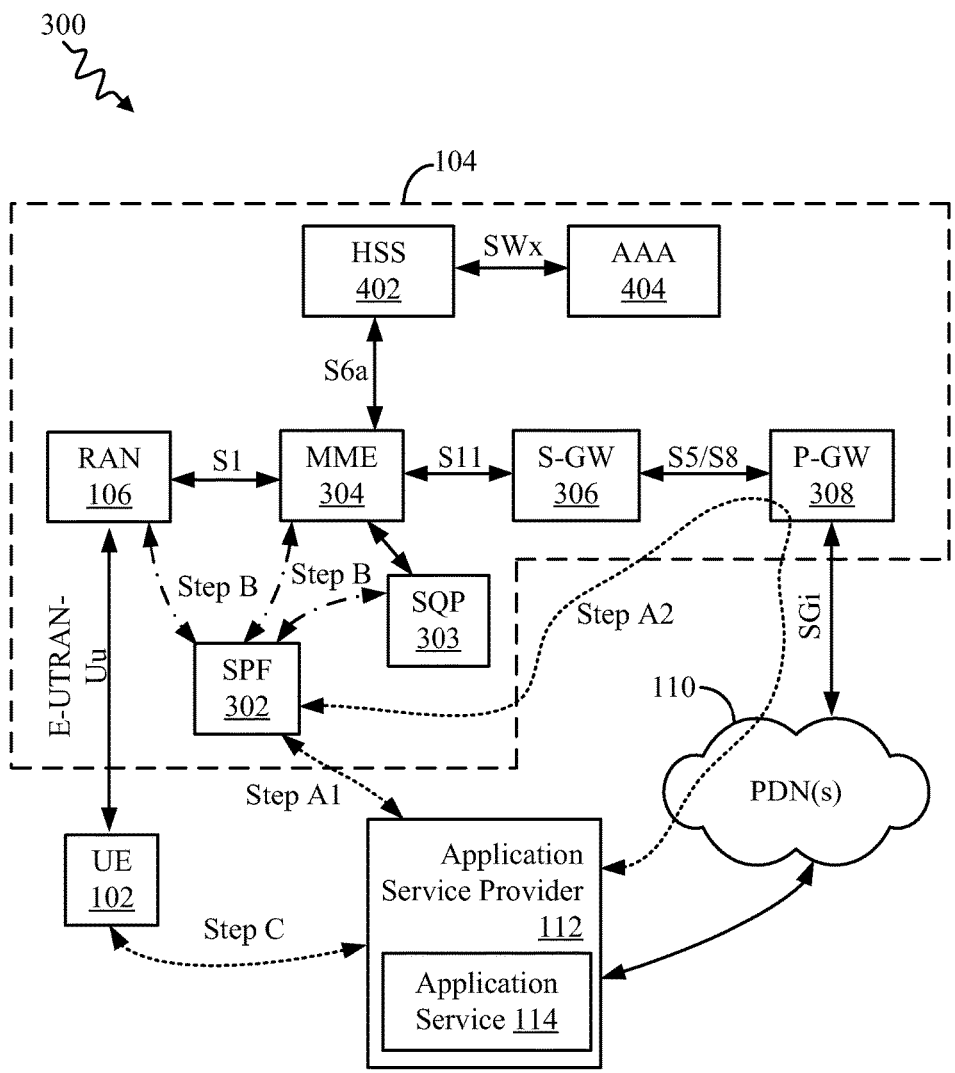
FIGS. 3 and 4 illustrate various processes/steps that are executed within an exemplary communication system for establishing sponsored connectivity using a shared key as an application-specific credential.
Figure 4:
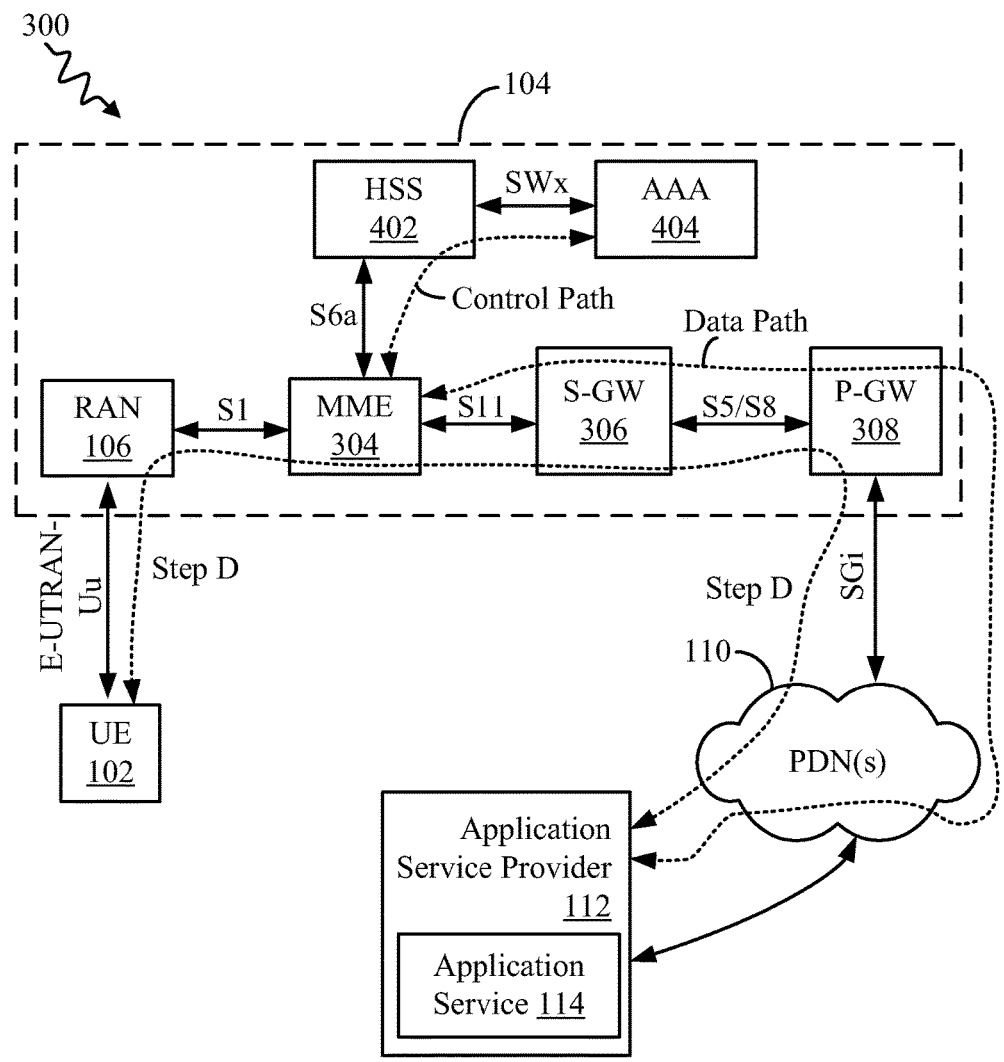

FIGS. 3 and 4 illustrate various processes/steps that are executed within an exemplary communication system 300 for establishing sponsored connectivity using a shared key as an application-specific credential according to one aspect of the disclosure. Referring to FIG. 3, the application service provider (ASP) 112 may first register an application service 114 to the wireless communication network 104 via a service provisioning function (SPF) 302 (Steps A1 or A2 and Step B), In some aspects the SPF 302 may be part of the wireless communication network 104 (e.g., it may be software residing at any network device of the network 104). Registration of the application service to the wireless communication network 104 may include providing/provisioning application service registration information that may include an application identifier that is uniquely associated to the application service, billing relation information, interface setup information between the SPF 302 and the ASP 112 (e.g., security associated information, virtual private network information, etc.), and so on. The application service registration information may be provided to network devices of the network 104 including, but not limited to, the RAN 106, MME 304, and/or the Service Query Protocol (SQP) server 303.

According to one aspect, the ASP 112 may communicate directly with the SPF 302 and transmit the application service registration information directly to the SPF 302 (i.e., step A1). In other aspects, the ASP 112 may not have a direct interface with the wireless communication network 104 and/or the SPF 302 and consequently the ASP 112 may transmit the application service registration information to the SPF 302 using a data line connection through the PDNs 110 and one or more packet data networks gateways (P-GW) 308 (i.e., Step A2). The SQP server 303 may handle queries from the user device 102 and provide at least a portion of the application service registration information received from the SPF 302 to the user device 102.

At Step C, the ASP 112 performs device registration where, among other things, the ASP 112 may provision the user device 102 with the application-specific credential, which in this case is a shared key that is uniquely associated with the user device 102. The ASP 112 may also provide an application identifier that identifies the application service the user device 102 wishes to access using sponsored connectivity. The ASP 112 may provide the application-specific credential to the user device 102 in a secure manner such as using the user device's public key or a secure channel (e.g., TLS). The application-specific credential may be stored in a secure execution environment of the user device 102. According to one aspect, the application-specific credential provisioning may be skipped if a password or an access token for the application access is used for the network access.

Referring to FIG. 4, an attach procedure (step D) is performed between the user device 102 and the application service provider 112. This consists of the user device 102 transmitting a registration request (e.g., attach request) to the wireless communication network 104. The registration request may include a device identifier identifying the user device 102 and an application identifier identifying the application service 114 to which the user device 102 desires sponsored connectivity. In one example, the application identifier may be a fully qualified domain name (FQDN). The wireless communication network 104 (e.g., MME 304) may then forward an authentication information request that includes the registration request and a serving network identifier to the application service provider 112 through the data path (see dashed arrow labeled "data path" in FIG. 4). The data path may be a secure data channel (e.g., TLS or hypertext transfer protocol secure (HTTPS)). Thus, the authentication information request message goes through one or more serving gateways (S-GWs) 306, one or more P-GWs 308, and one or more packet data networks 110 to reach the application service provider 112 from the MME 304. By contrast, in the prior art, authentication requests pertaining to granting a user device general cellular network access are sent to an HSS/AAA entity 402/404 from the MME 304 over a dedicated, direct control path and interface with an MME (e.g., S6a interface) instead of through the data path. The ASP 112 may then look up the shared key associated with the device identifier and application identifier it received in the authentication information request and supply authentication information back to the wireless communication network 104 to facilitate authentication and key agreement with the user device 102.

Figure 5:
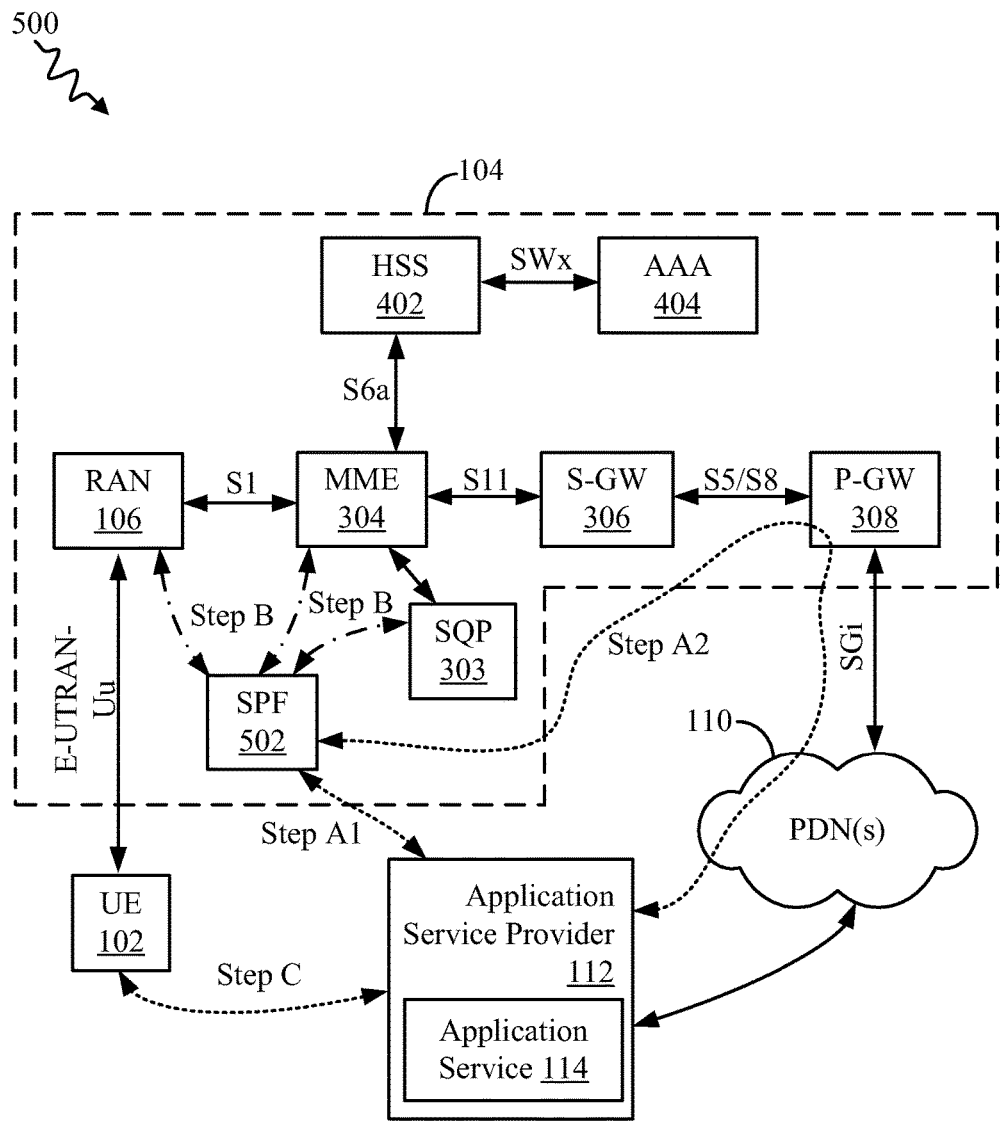
FIGS. 5 and 6 illustrate various processes/steps that are executed within an exemplary communication system for establishing sponsored connectivity using a public key certificate as an application-specific credential.
Figure 6:
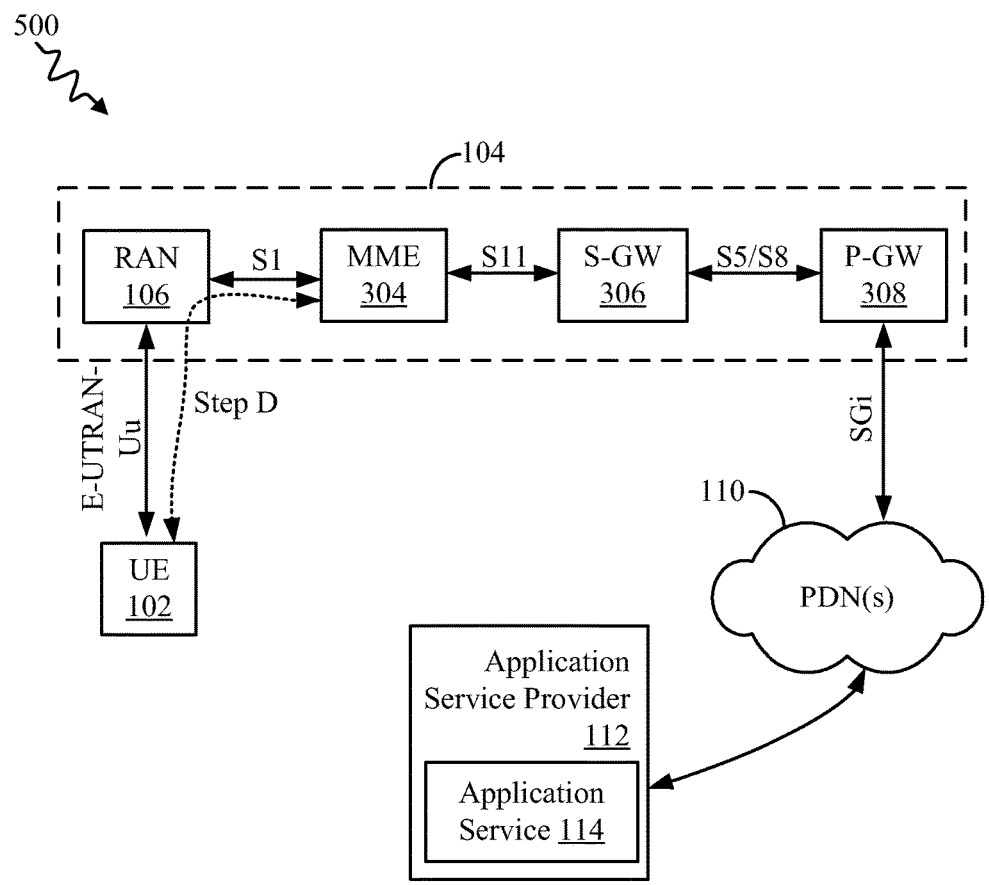

FIGS. 5 and 6 illustrate various processes/steps that are executed within an exemplary communication system 500 for establishing sponsored connectivity using a public key certificate as an application-specific credential according to one aspect of the disclosure. Referring to FIG. 5, the ASP 112 may first register an application service 114 to the wireless communication network 104 via a service provisioning function (SPF) 502 (Steps A1 or A2 and Step B). In some aspects the SPF 502 may be part of the wireless communication network 104 (e.g., it may be software residing at any network device of the network 104). Registration of the application service 114 with the wireless communication network 104 may include providing/provisioning application service registration information that may include an application identifier that is uniquely associated to the application service, billing relation information, interface setup information between the SPF 302 and the ASP 112 (e.g., security associated information, virtual private network information, etc.), and so on. The application service registration information may be provided to network devices of the network 104 including, but not limited to, the RAN 106, MME 304, and/or the Service Query Protocol (SQP) server 303. The ASP 112 also provisions one or more network devices, such as the RAN 106 and/or the MME 304 with an application service provider public key (Step B). The public key may be provided by itself or in the form of a certificate (e.g., self-signed application service provider public key certificate or a certificate signed by a third party). In one aspect, the ASP 112 provides a different application service provider public key (or application service provider public key certificate) to the network devices 106, 304 for each application service 114 it hosts. In another aspect, the ASP 112 may provide the same application service provider public key (or application service provider public key certificate) to the network devices 106, 304 for each application service 114 it hosts.

According to one aspect, the ASP 112 may communicate directly with the SPF 502 and transmit the application service registration information including the application service provider certificate (ASP's public key certificate or ASP's public key) directly to the SPF 502 (i.e., step A1). In other aspects, the ASP 112 may not have a direct interface with the wireless communication network 104 and/or the SPF 502 and consequently the ASP 112 may transmit the application service registration information and the application service provider certificate to the SPF 502 using a data line connection through the PDNs 110 and one or more packet data networks gateways (P-GW) 308 (i.e., Step A2). The SQP server 303 may handle queries from the user device 102 and provide at least a portion of the application service registration information received from the SPF 502 to the user device 102.

At Step C, the ASP 112 performs device registration where, among other things, the ASP 112 may provision the user device 102 with the application-specific credential, which in this case may be an application-specific certificate. The application-specific certificate may be a simple public key infrastructure (SPKI) certificate ([identity+public key], [authorizations/signature]) that includes the user device identifier, user device public, key, and an application-specific digital signature. The application-specific digital signature may be the user device's 102 public key signed by a private key of the application service provider (i.e., application service provider's private key). In some aspects, the application-specific digital signature may also include the application identifier (i.e. the ASP 112 signs both the application identifier and the user device's 102 public key). In the latter case, the application-specific certificate also includes the application identifier, According to one aspect, the private key used by the application service provider 112 to sign the application-specific digital signature may be uniquely associated with each application service 114 the application service provider 112 provides/hosts, In one aspect, rather than provisioning the user device 102 with the entire application-specific certificate, the ASP 112 provisions the user device 102 with simply the application-specific digital signature and the user device may later append its user device identifier, user device public key, and in some cases the application identifier, to form the complete application-specific certificate.

The application service provider 112 may provide the application-specific certificate to the user device 102 in a secure manner such as using the user device's public key or a secure channel (e.g., TLS). The application-specific certificate may be stored in a secure execution environment or trusted execution environment of the user device 102.

According to one aspect, the application-specific credential provisioning may be skipped if a password or an access token for the application access is used for the network access.

Referring to FIG. 6, an attach procedure (step D) is performed between the user device 102 and the application service provider 112. This consists of the user device 102 transmitting a registration request (e.g., attach request) to the wireless communication network 104. The registration request includes the application-specific certificate. The MME 304 verifies the application-specific digital signature included in the certificate to verify the identity of the user device 102. Similarly, the MME 304 may broadcast an application service announcement to the user device 102 that includes a wireless communication network digital signature. The user device 102 may verify the wireless communication network digital signature using a public key of the wireless communication network 104 that was provisioned to it by the application service provider 112. The MME 304 and the user device 102 may then perform authentication and key agreement with each other independent to the application service provider 112 (i.e., without having to contact the application service provider 112 for authentication of the user device). Thus, authentication and key agreement is performed in the "first mile" (i.e., at the MME 304) and not further into the core network 108.

In some aspects, the application-specific credential may include a combination of a shared key(s) and application-specific certificate(s). For example, the application-specific certificate may be used for initial identify verification of the user device 102, and a shared key may be used for authentication and key agreement.

Figure 7A:
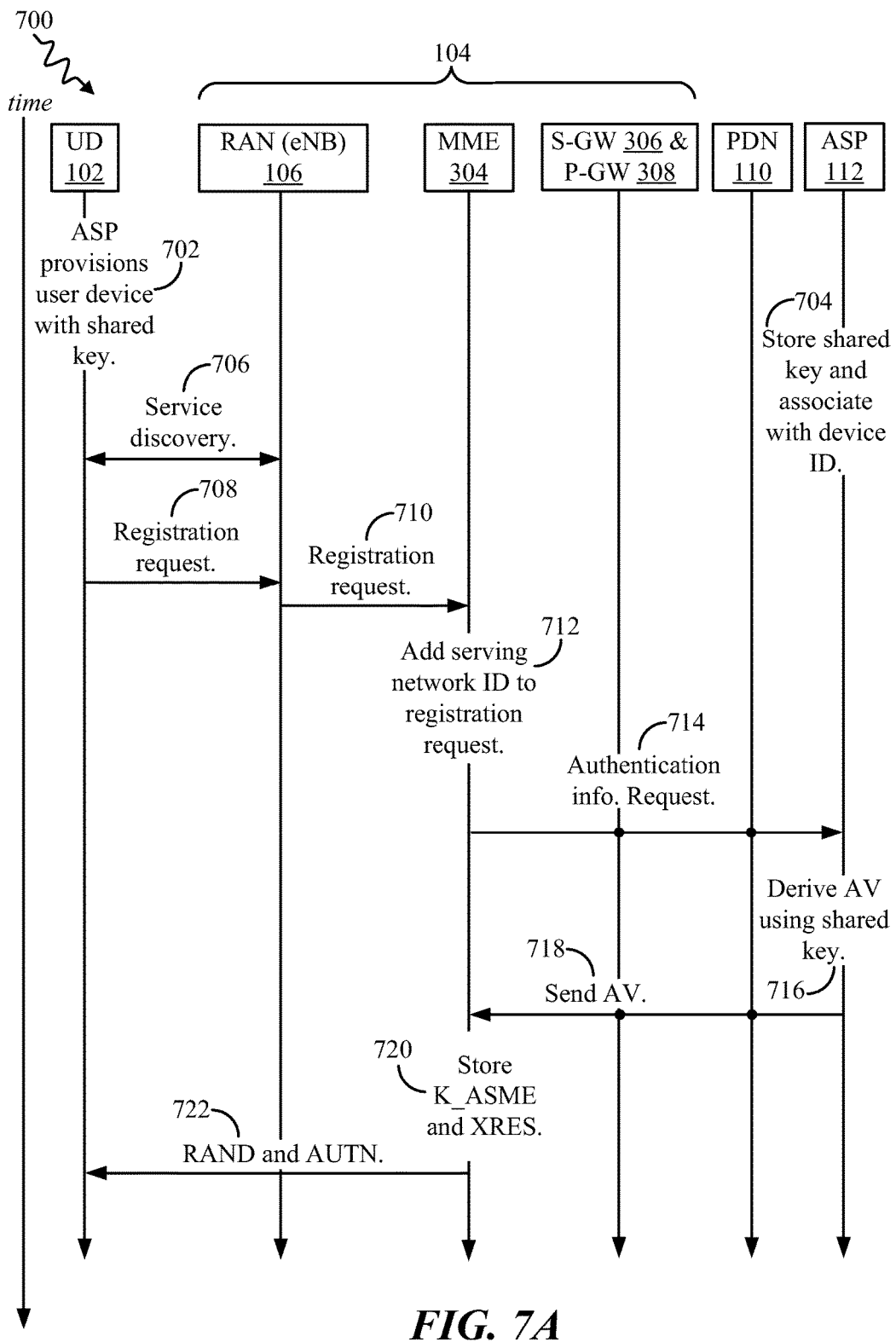
FIGS. 7A and 7B illustrate a process flowchart for executing sponsored connectivity using a shared key.
Figure 7B:
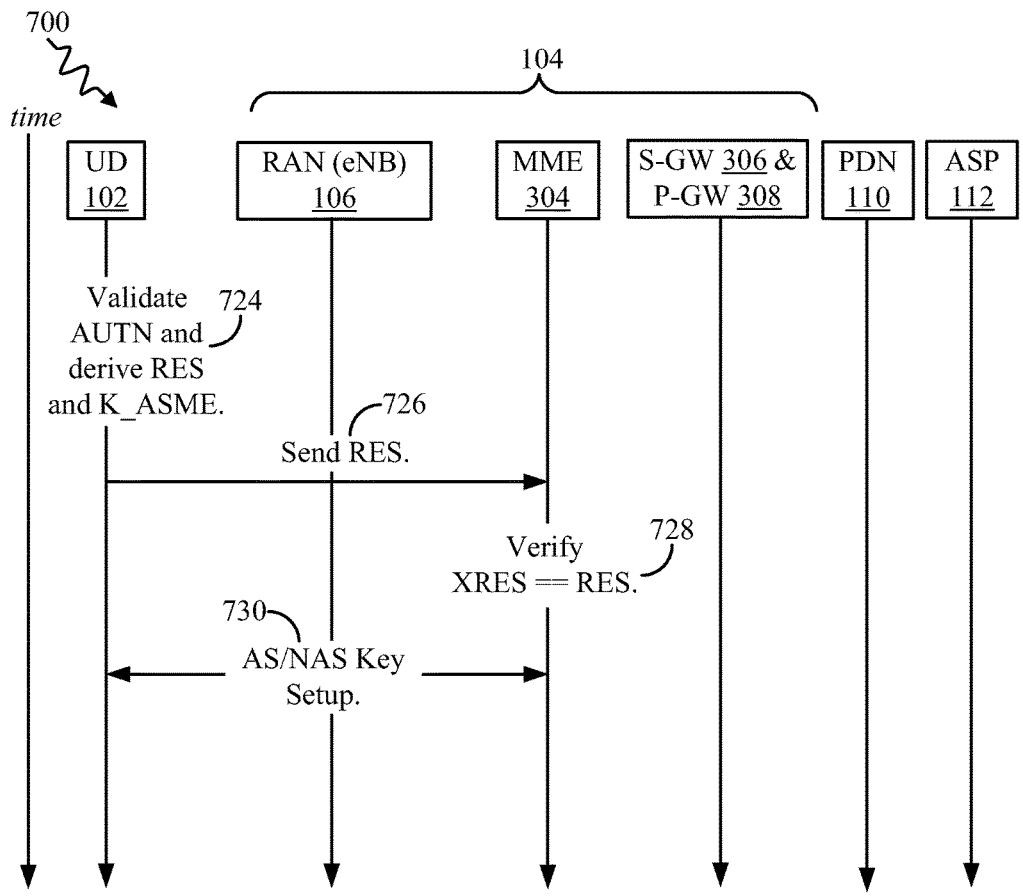

FIGS. 7A and 7B illustrate a process flowchart 700 for executing sponsored connectivity using a shared key according to one aspect of the disclosure. When a user registers the user device 102 to the application service provider 112 (e.g., application server) the user device 102 is provisioned 702 with a shared key by the application service provider 112. In some aspects, the user device 102 may also be provisioned with a device identifier (e.g., user identifier) and/or an application identifier (e.g., fully qualified domain name) associated with an application service by the application service provider. In other aspects, the user device 102 may already be in possession of a user identifier (e.g., at the time of manufacture) and it provides this device identifier to the ASP 112 during device registration so that the ASP 112 can associate the device identifier with the shared key. The device identifier may be an international mobile station equipment identifier (MEI), an Institute of Electrical and Electronics Engineers (IEEE) Extended Unique Identifier (EUI) address (e.g., EUI-48 or EUI-64) (i.e., media access control (MAC) address), mobile station subscriber international subscriber directory number (MSISDN), network access identifier (NAI), etc. The shared key is kept secret and may be pre-shared between the user device 102 and the application service provider 112 via an out of band communication channel (e.g., Wi-Fi®). The application service provider 112 also stores 704 the shared key associated with the user device 102 (e.g., associated with the device identifier of the user device 102). The application service provider 112 may also register the application service to the mobile network operator's (MNO's) wireless network 104 so the network 104 can then begin to broadcast/transmit application service announcements for availability of sponsored connectivity for the application service.

A service discovery procedure is performed 706 between the user device 102 and the RAN 106 (e.g., eNB) of the wireless network 104 that allows the user device 102 to detect whether the wireless network 104 provides the application service(s) that the user device 102 may be interested in. The service discovery may be enabled by a service provisioning function via Service Query Protocol (SQP), which has a similar functionality to a generic advertisement service (GAS) and active network query protocol (ANQP). Once the user device 102 determines that the wireless network 104 provides sponsored connectivity to the application service(s) that it wants, the user device 102 sends 708 a registration request (e.g., attach request) message that includes its device identifier and the application identifier (e.g., FQDN) to the RAN 106. The RAN 106 forwards 710 the registration request message to the MIME 304. The MME. 304 then adds 712 a serving network identifier (e.g., an identifier that identifies the serving network) to the registration request message to form an authentication information request. The MME then sends 714 the authentication information request message to the application service provider 112 over a data path (e.g., data channel, data traffic communication line, data connection, etc., see "Data Path" in FIG. 4), which may be secure (e.g., TLS or hypertext transfer protocol secure (HTTPS)). Thus, the authentication information request message goes through one or more S-G-Ws 506, one or more P-GWs 508, and one or more packet data networks 110 before reaching the application service provider 112. By contrast, in the prior art, authentication requests pertaining to granting a user device cellular network access are sent to an HSS/AAA entity over a dedicated, direct control channel interface with an MME (e.g., S6a interface) instead of through a data connection.

The application service provider 112 derives 716 an authentication vector (AV) Bona the shared key associated with the user device 102 and sends 718 the AV to the MME 304. Derivation of the AV is described in 3GPP 33.401 where AV=[K_ASME, AUTN, RAND, XRES] and K_ASME is a key (e.g., access security management entity (ASME), AUTN is an authentication token, RAND is a random number, and XRES is the expected response. The MME 304 stores 720 the values K_ASME and XRES in local memory and forwards 722 RAND and AUTN to the user device 102. The user device 102 validates the value AUTN received using its stored shared key, If the value AUTN is valid, the user device 102 derives 724 an authentication response (RES) for the serving network 104 and also derives K_ASME. The user device 102 sends 726 the value RES to the MME 304. The MME 304 verifies 728 if XRES==RES. If the verification is successful, non-access stratum (NAS) and access stratum (AS) key setup is executed 730 between the user device 102 and the MME 304.

Figure 8A:
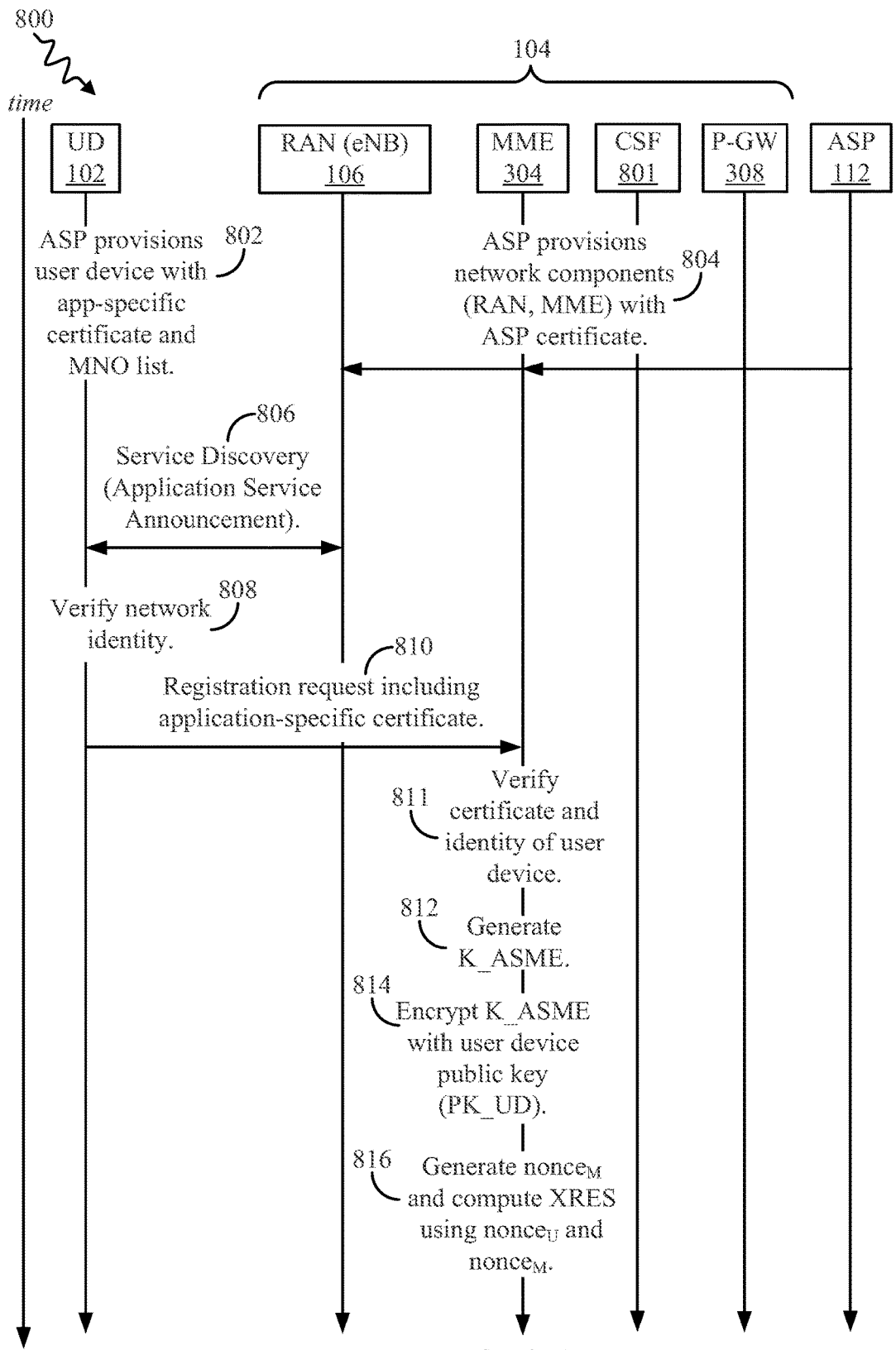
FIGS. 8A and 8B illustrate a process flowchart for executing sponsored. connectivity using a public key certificate.
Figure 8B:
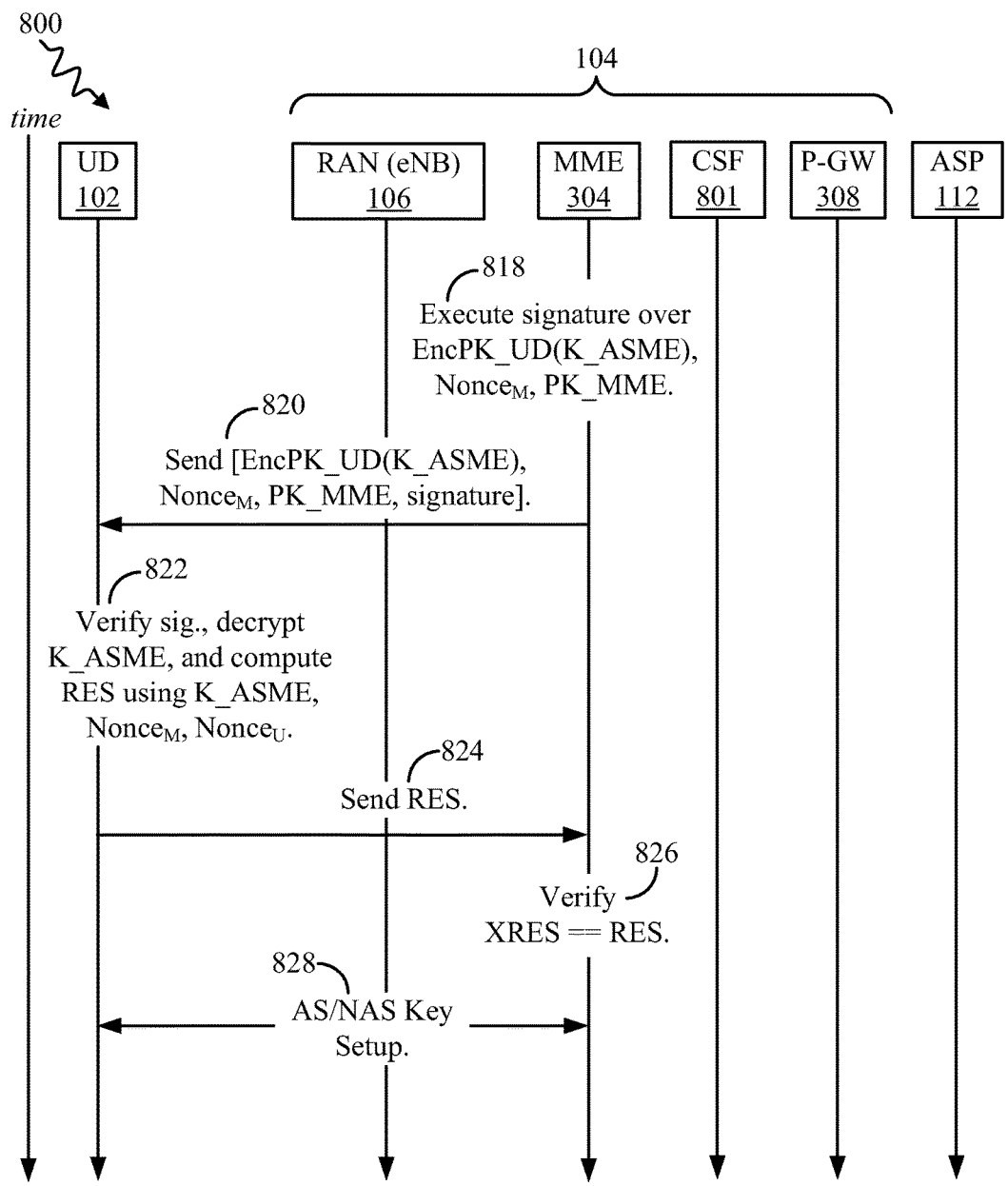

FIGS. 8A and 8B illustrate a process flowchart 800 for executing sponsored connectivity using a public key certificate according to one aspect of the disclosure. When the user device 102 registers with the application service provider 112, the application service provider 112 provisions 802 the user device 102 with an application-specific certificate. The ASP 112 may also provision the user device 102 with a device identifier and/or a trusted MNO and certificate list that includes a plurality of public key certificates of trusted wireless communication networks (e.g., MNOs). In one aspect, the user device 102 has its own device identifier that it provides to the ASP 112 during device registration so that the ASP stores the device identifier associated with the application-specific certificate provided. The device identifier may be an IMEI, IEEE EUI-48/EUI-64 address (i.e., MAC address), MSISDN or NAI. Alternatively, a device identifier may be the hash of its public key.

The application service provider 112 also transmits application service registration information to components/devices of the wireless communication network 104 (e.g., via an SPF 502 see FIG. 5). Application service registration information may include an application identifier that is uniquely associated to the application service, billing relation information, interface setup information between an SPF and the ASP 112 (e.g., security associated information, virtual private network information, etc.), and so on. The ASP 112 also provisions 804 one or more network devices, such as the RAN 106 and/or the MME 304 with an application service provider certificate (e.g., ASP's public key certificate). The ASP certificate may be self-signed (i.e., signed by the ASP) or signed by a trusted third party entity. In some aspects, the ASP may merely provision the one or more network devices with simply the public key (i.e., not the public key certificate).

As part of an application service announcement 806 by the RAN 106, a protocol similar to GAS/ANQP may be used for service discovery. The application service announcement may include a wireless communication network digital signature. If the service announcement includes such a digital signature, the user device 102 may verify 808 the digital signature using the wireless communication network public key that was provisioned to it in the trusted MNO's certificate list by the application service provider 112. The user device 102 may then send 810 a registration request to the MMF. 304 that includes the application-specific certificate. The registration request may also include the device identifier and a first random number (e.g., $Nonce_U$). The MME 304 may then verify 811 the application-specific digital signature included in the application-specific certificate using the application service provider certificate (i.e., using the public key of the ASP certificate) it was previously provisioned with, This verifies/authenticates 811 the identity of the user device 102.

Once verification 811 is successful, the MME 304 may then randomly generate 812 a key (K_ASME) and encrypt 814 K_ASME using the user device's 102 public key PK_UD (i.e., EncPK_(K_ASME) where Enc( ) is an encryption function). The MME 304 may then randomly generate a second random number (e.g., $Nonce_M$) and compute 816 XRES=HMAC(K_ASME, $Nonce_U|Nonce_M$) (where HMAC( ) is a keyed-hash message authentication code). The MME 304 then executes 818 a signature over EncPK_UD (K_ASME), $Nonce_M$, PK_MME (where PK_MME is the public key of the MME 304). The MME 304 sends 820 EncPK_UE(K_ASME), $Nonce_M$, PK_MME, and the signature to the user device 102. The user device 102 verifies the signature, decrypts K_ASME using its private key, and computes 822 RES=HMAC(K_ASME, $Nonce_U|Nonce_M$). The user device 102 sends 824 the value RES to the MME 304. The MME 304 compares 826 the value RES to the value XRES, and if they match (i.e., MME 304 successfully authenticates the user device), NAS and application service (AS) key setup is executed 828 between the user device 102 and the MME 304.

According to one aspect, the application service provider 112 may provide a certificate revocation list to the wireless communication network 104, which may then store the revocation list at the certificate service function (CSF) 801. The revocation list identifies those application-specific certificates that have been revoked or are otherwise invalid. The MMF 304 may check with the CSF 801 to determine whether or not a user device attempting to obtain application-specific access has provided an application-specific certificate that is on the revocation list. If it is then the MME 304 may deny authentication of the user device 102 (i.e., deny application-specific access). According to one aspect, the CSF 801 stores an application-specific certificate for the duration of its lifetime (i.e., until its expiration date) regardless of whether the certificate is revoked prior to its expiration. For instance, an application-specific certificate may have a 1 year lifetime (i.e., expires in 1 year) but may be revoked after just one month. The CSF 801 may nevertheless store the certificate for the 11 months remaining in its lifetime. In another aspect, the CSF 801 may run an online certificate status protocol (OCSP) responder to provide certificate revocation status to the MMEs 304.

Figure 9:
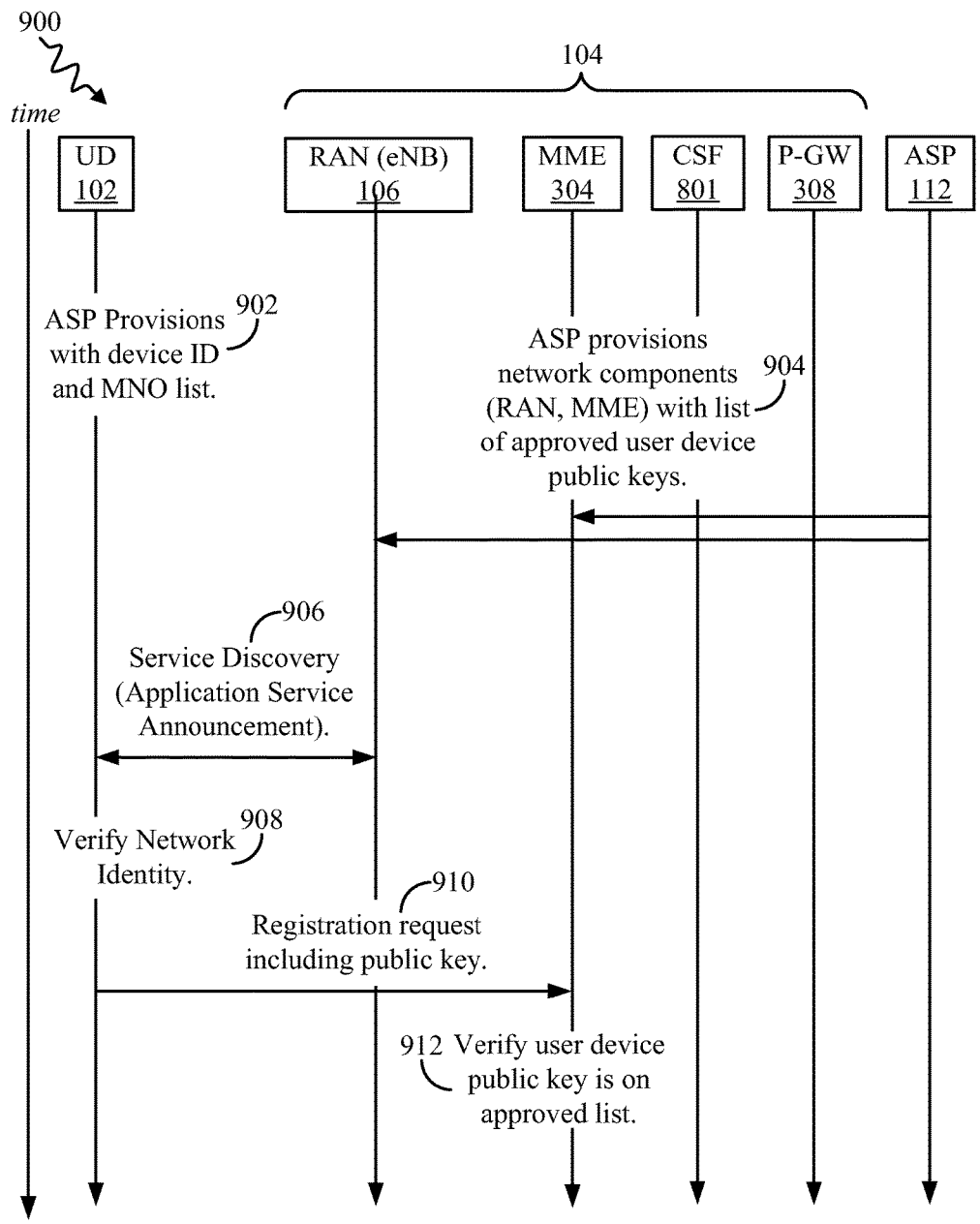
FIG. 9 illustrates a process flowchart for executing sponsored connectivity using a public key.

FIG. 9 illustrates a process flowchart 900 for executing sponsored connectivity using a public key according to one aspect of the disclosure. When the user device 102 registers with the application service provider 112, the application service provider 112 may provision 902 the user device 102 with a device identifier and a trusted MNO and certificate list that includes a plurality of public key certificates of trusted wireless communication networks (e.g., MNOs). The device identifier may be an IMEI, IEEE EUI-48/EUI-64 address (i.e., MAC address), MSISDN or NAT, or hash of its public key. The user device 102 also provides the ASP 112 with its public key which the ASP 112 may store.

The application service provider 112 also transmits application service registration information to components/devices of the wireless communication network 104. Application service registration information may include an application identifier that is uniquely associated to the application service, billing relation information, interface setup information between an SPF and the ASP 112 (e.g., security associated information, virtual private network information, etc.), and so on. The ASP 112 also provisions 904 one or more network devices, such as the RAN 106 and/or the MME 304 with a list of user device public keys that are approved for application-specific access for the application service provided by the application service provider.

As part of an application service announcement 906 by the RAN 106, a protocol similar to GAS/ANQP may be used for service discovery. The application service announcement may include a wireless communication network digital signature. If the service announcement includes such a digital signature, the user device 102 may verify 908 the signature using the wireless communication network public key that was provisioned to it in the trusted MNO's certificate list by the application service provider 112. The user device 102 may then send 910 a registration request to the MME 304 that includes the user device public key. The registration request may also include the device identifier and a first random number (e.g., Nonce$_U$). The MME 304 may then check to verify 912 the identity of the user device by checking to see whether the public key provided by the user device matches a public key on the list of approved public keys provided to it earlier by the application service provider 112. If it does then the user device's 102 identity is verified. If not then authentication is failed and the user device 102 may not be able to obtain application-specific access. After verification 912, the process 900 may follow the same the authorization and key agreement process shown in FIGS. 8A and 8B (steps 812 through 828).

According to one aspect, the application-specific credential may not be based on a subscriber identity module (SIM) credential or a universal subscriber identity module (USIM) credential since the user device may not have a SIM or USIM. The application-specific credential may only permit access through the wireless network 104 to a specific application service 114 of the application service provider 112, or to a set of application services. Some non-limiting, non-exclusive examples of how the application-specific credential may be provisioned in a secure manner when the application-specific credential includes a shared key include a dynamic symmetric key provisioning protocol (DSKPP (RFC 6063)) and/or a cryptographic token key initialization protocol (CT-KIP (RFC 4758)). When the application-specific credential includes a public key certificate, a certificate management over cryptographic message syntax (CMS (RFC 5272, 6402)) protocol may be used to securely provision the application-specific credential.

Figure 10:
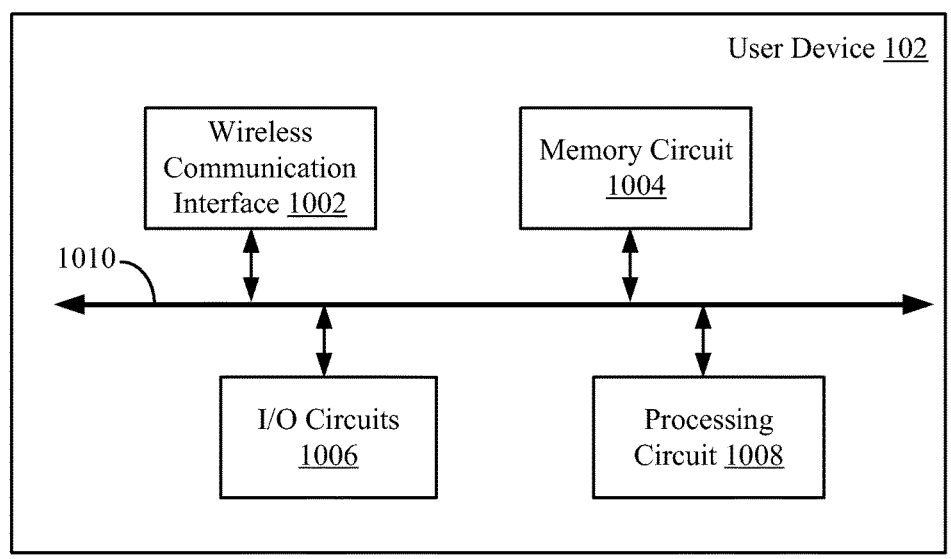
FIG. 10 illustrates a schematic block diagram of a user device.

FIG. 10 illustrates a schematic block diagram of the user device 102 according to one aspect of the disclosure. The user device 102 may be any wireless communication device such as, but not limited to, a mobile phone, a smartphone, a laptop, a personal digital assistant (PDA), a, tablet, a computer, a smart-watch, and a head-mounted wearable computer (e.g., Google Glass®). The user device 102 may include at least one or more wireless communication interfaces 1002, one or more memory circuits 1004, one or more input and/or output (I/O) devices/circuits 1006, and/or one or more processing circuits 1008 that may be communicatively coupled to one another. For example, the interface 1002, the memory circuit 1004, the I/O devices 1006, and the processing circuit 1008 may be communicatively coupled to each other through a bus 1010. The wireless communication interface 1002 allows the user device 102 to communicate wirelessly with the wireless communication network 104. Thus, the interface 1002 allows the user device 102 to communicate wirelessly with wireless wide area networks (WWAN), such as mobile telecommunication cellular networks, as well as short range, wireless local area networks (e.g., WiFi®, Zigbee®, Bluetooth®, etc.). The wireless communication interface 1002 represents one example of a means for the user device to communicate with an application service after authentication and key agreement is successfully performed.

The memory circuit 1004 may include one or more volatile memory circuits and/or non-volatile memory circuits. Thus, the memory circuit 1004 may include dynamic random access memory (DRAM), static random access memory (SRAM), magnetoresistive random access memory (MRAM), electrically erasable programmable read-only memory (EEPROM), flash memory, etc. The memory circuit 1004 may store one or more cryptographic keys, such as shared keys and public key certificates (e.g., application-specific certificates, wireless communication network public key certificates, trusted MNO certificates, etc.). The memory circuit 1004 may also store instructions that may be executed by the processing circuit 1008. The I/O devices/circuits 1006 may include one or more keyboards, mice, displays, touchscreen displays, printers, fingerprint scanners, and any other input and/or output devices.

The processing circuit 1008 (e.g., processor, central processing unit (CPU), application processing unit (APU), etc.) may execute instructions stored at the memory circuit 1006 and/or instructions stored at another computer-readable storage medium (e.g., hard disk drive, optical disk drive, solid-state drive, etc.) communicatively coupled to the user device 102. The processing circuit 1008 may perform any one of the steps and/or processes of the user device 102 described herein including those discussed with reference to FIGS. 2, 3, 4, 5, 6, 7A, 7B, 8A, 8B, 9, 13, and 14. According to one aspect, the processing circuit 1008 may be a general purpose processor. According to another aspect, the processing circuit may be hard-wired (e.g., it may be an application-specific integrated circuit (ASIC)) to perform the steps and/or processes of the user device 102 described herein including those discussed with reference to FIGS. 2, 3, 4, 5, 6, 7A, 7B, 8A, 8B, 9, 13, and 14.

Figure 11:
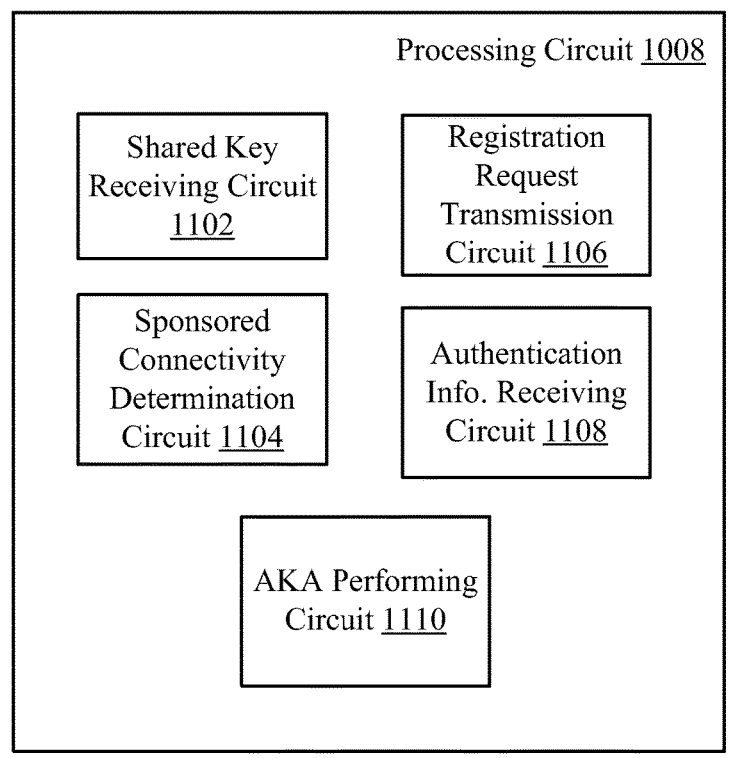
FIG. 11 illustrates a first exemplary schematic block diagram of the user device's processing circuit.

FIG. 11 illustrates a schematic block diagram of the user device processing circuit 1008 according to one aspect. The processing circuit 1008 may include a shared key receiving circuit 1102, a sponsored connectivity determination circuit 1104, registration request transmission circuit 1106, an authentication information receiving circuit 1108, and/or an authorization and key agreement (AKA) performing circuit 1110. According to one aspect, these circuits 1102, 1104, 1106, 1108, 1110 may be ASICs and are hard-wired to perform their respective processes. The shared key receiving circuit 1102 may be one example of a means for receiving and storing a shared key from an application service provider. The sponsored connectivity determination circuit 1104 may be one example of a means for determining that a wireless communication network provides application-specific access to an application service provided by the application service provider. The registration request transmission circuit 1106 may be one example of a means for transmitting a registration request that includes a device identifier and an application identifier associated with the application service to the wireless communication network. The authentication information receiving circuit 1108 may be one example of a means for receiving, from the wireless communication network, authentication information derived at the application service provider that is based in part on the shared key. The AKA performing circuit 1110 may be one example of a means for performing authentication and key agreement with the wireless communication network based on the authentication information and the stored shared key.

Figure 12:
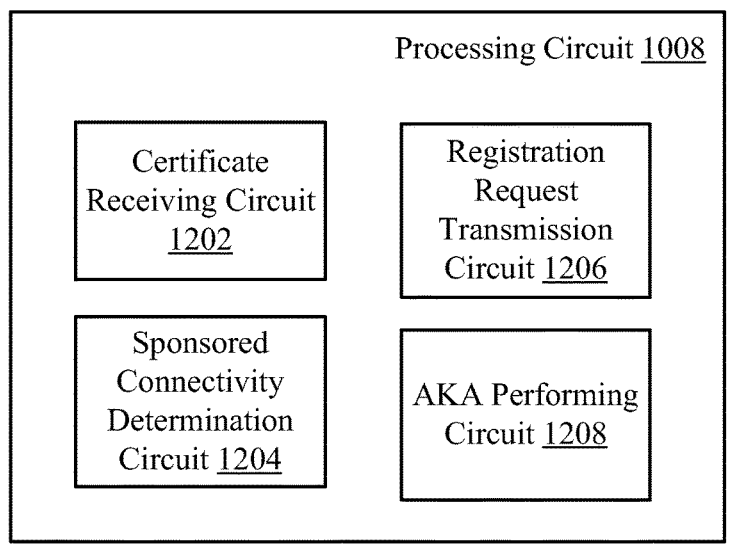
FIG. 12 illustrates a second exemplary schematic block diagram of the user device's processing circuit.

FIG. 12 illustrates a schematic block diagram of the user device processing circuit 1008 according to another aspect. The processing circuit 1008 may include a certificate receiving circuit 1202, a sponsored connectivity determination circuit 1204, a registration request transmission circuit 1206, and/or an authorization and key agreement (AKA) performing circuit 1208. According to one aspect, these circuits 1202, 1204, 1206, 1208 may be ASICs and are hard-wired to perform their respective processes. The certificate receiving circuit 1202 may be one example of a means for receiving, from an application service provider, an application-specific certificate associated with at least one application service provided by the application service provider. The sponsored connectivity determination circuit 1204 may be one example of a means for determining that a wireless communication network provides application-specific access to an application service provided by the application service provider. The registration request transmission circuit 1206 may be one example of a means for transmitting a registration request including the application-specific certificate to the wireless communication network for authentication of the user device, the application-specific certificate including a public key associated with the application service. The AKA performing circuit 1208 may be one example of a means for performing authentication and key agreement with the wireless communication network.

Figure 13:
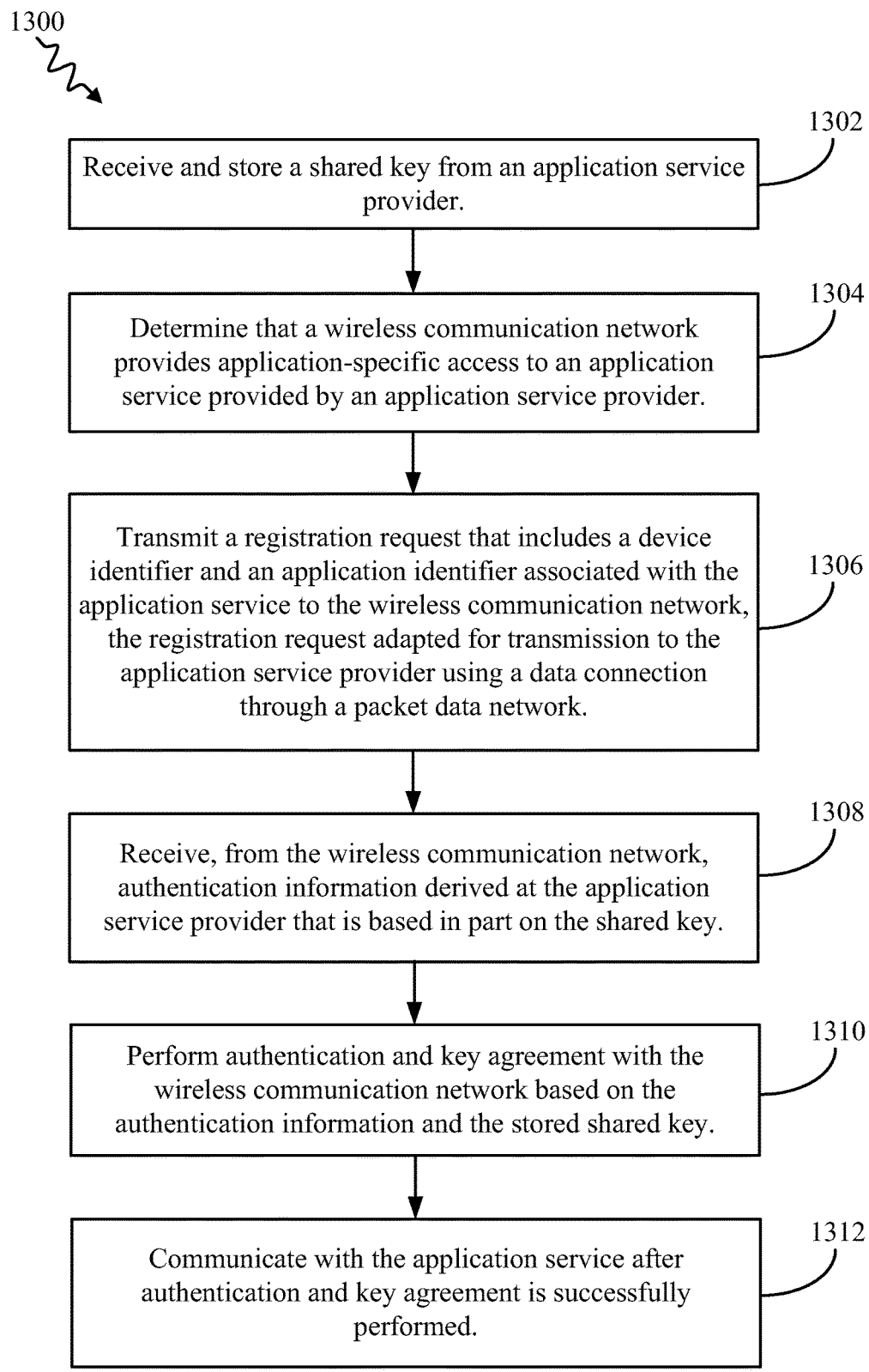
FIG. 13 illustrates a flowchart of a first exemplary method operational at a user device for obtaining application-specific access.

FIG. 13 illustrates a flowchart 1300 of a method operational at a user device 102 for obtaining application-specific access according to one aspect of the disclosure. First, the user device 102 receives and stores a shared key from an application service provider 1302. Then, the user device 102 determines that a wireless communication network provides application-specific access to an application service provided by an application service provider 1304. Next, a registration request is transmitted that includes a device identifier and an application identifier associated with the application service to the wireless communication network, the registration request adapted for transmission to the application service provider using a data connection through a packet data network 1306. Then, the user device 102 receives, from the wireless communication network, authentication information derived at the application service provider that is based in part on the shared key 1308. Next, authentication and key agreement is performed with the wireless communication network based on the authentication information and the stored shared key 1310. Then, the user device may communicate with the application service after authentication and key agreement is successfully performed 1312.

Figure 14:
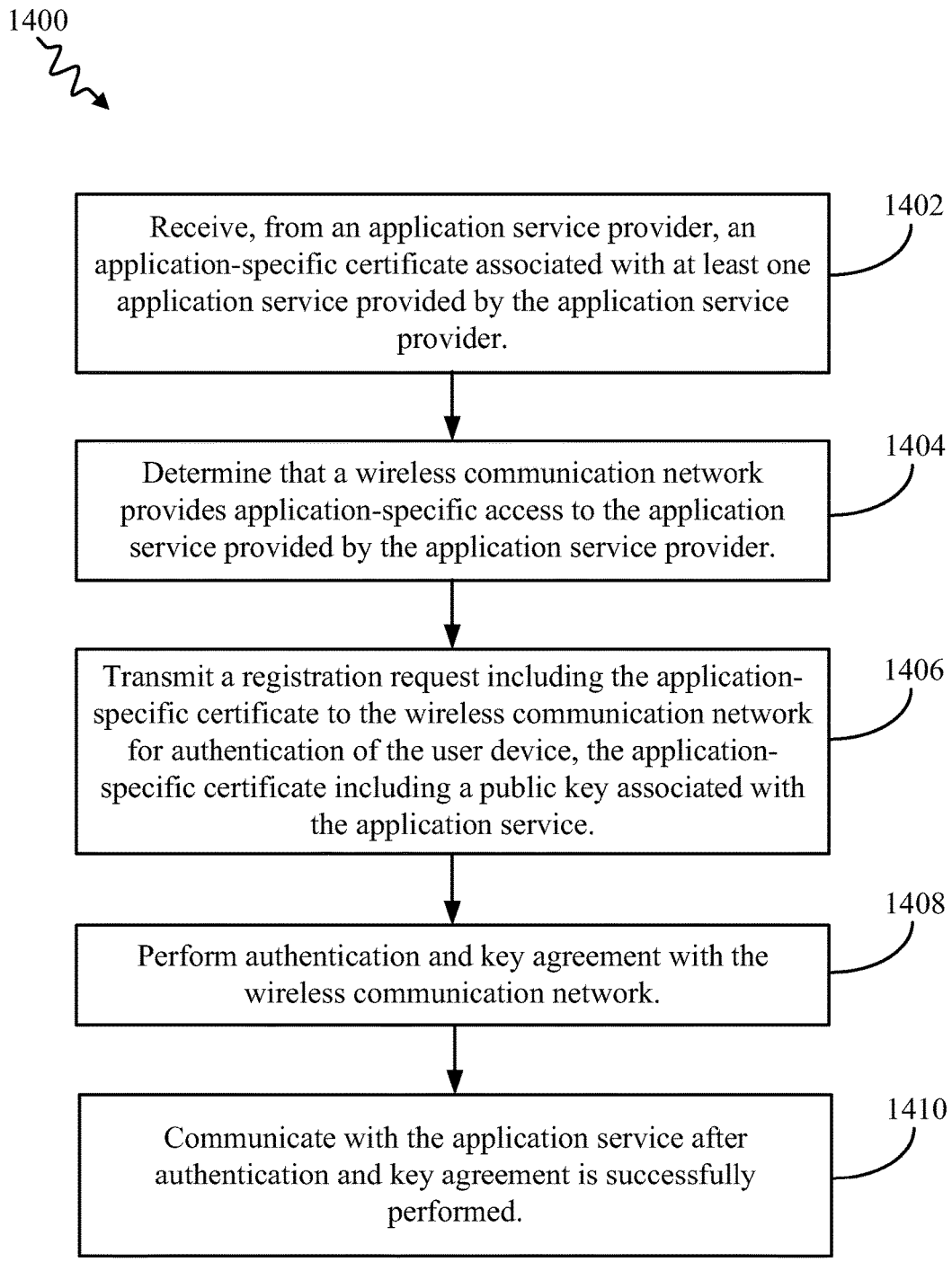
FIG. 14 illustrates a flowchart of a second exemplary method operational at a user device for obtaining application-specific access.

FIG. 14 illustrates a flowchart 1400 of a method operational at a user device 102 for obtaining application-specific access according to one aspect of the disclosure. First, the user device 102 receives, from an application service provider, an application-specific certificate associated with an application service provided by the application service provider 1402. Then, the user device 102 determines that a wireless communication network provides application-specific access to the application service provided by the application service provider 1404. Next, a registration request including the application-specific certificate is transmitted to the wireless communication network for authentication of the user device, the application-specific certificate including a public key associated with the application service 1406 (e.g., may be user device public key). Then, the user device 102 performs authentication and key agreement with the wireless communication network 1408. Next, the user device may communicate with the application service after authentication and key agreement is successfully performed 1410.

Figure 15:
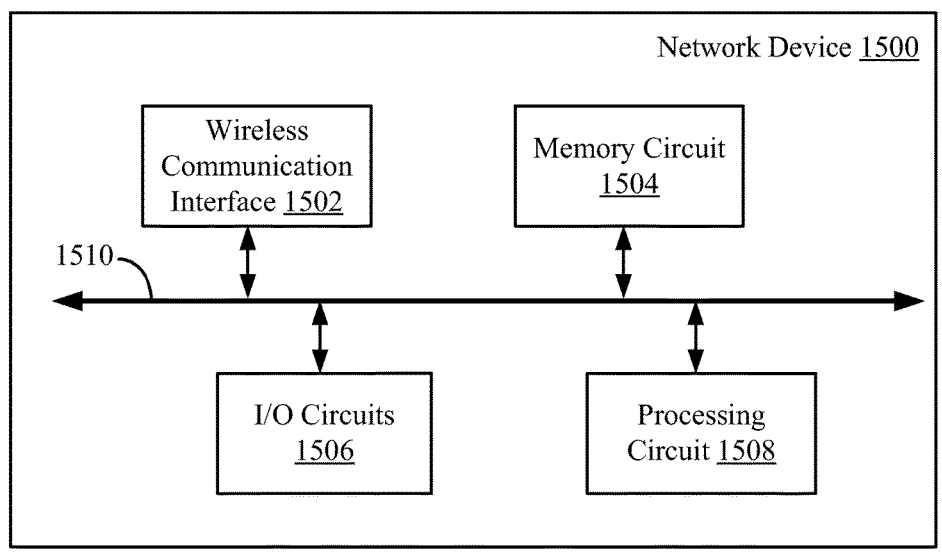
FIG. 15 illustrates a schematic block diagram of a wireless communication network device.

FIG. 15 illustrates a schematic block diagram of a wireless communication network device 1500 according to one aspect of the disclosure. The network device 1500 may be any one of the components/devices of the wireless communication network 104 (see FIGS. 1, 3, and 5) including, but not limited to, the RAN 106 and/or the MME 304. The network device 1500 may include at least one or more wireless communication interfaces 1502, one or more memory circuits 1504, one or more input and/or output (I/O) devices/circuits 1506, and/or one or more processing circuits 1508 that may be communicatively coupled to one another. For example, the interface 1502, the memory circuit 1504, the I/O devices 1506, and the processing circuit 1508 may be communicatively coupled to each other through a bus 1510. The wireless communication interface 1502 allows the network device 1500 to communicate wirelessly with the user device 102. Thus, the interface 1502 allows the network device 1500 to communicate wirelessly through wireless wide area networks (WWAN), such as mobile telecommunication cellular networks, and/or short range, wireless local area networks (e.g., WiFi®, Zigbee®, Bluetooth®, etc.).

The memory circuit 1504 may include one or more volatile memory circuits and/or non-volatile memory circuits. Thus, the memory circuit 1504 may include DRAM, SRAM, MRAM, EEPROM, flash memory, etc. The memory circuit 1504 may store one or more cryptographic keys such as public key certificates (e.g., application service provider certificates). The memory circuit 1504 may also store instructions that may be executed by the processing circuit 1508. The I/O devices/circuits 1506 may include one or more keyboards, mice, displays, touchscreen displays, printers, fingerprint scanners, and any other input and/or output devices.

The processing circuit 1508 (e.g., processor, central processing unit (CPU), application processing unit (APU), etc.) may execute instructions stored at the memory circuit 1506 and/or instructions stored at another computer-readable storage medium (e.g., hard disk drive, optical disk drive, solid-state drive, etc.) communicatively coupled to the network device 1500. The processing circuit 1508 may perform any one of the steps and/or processes of the network devices 106, 304, 306, 308 described herein including those discussed with reference to FIGS. 2, 3, 4, 5, 6, 7A, 7B, 8A, 8B, 9, 18, and 19. According to one aspect, the processing circuit 1508 may be a general purpose processor. According to another aspect, the processing circuit 1508 may be hard-wired (e.g. it may be an application-specific integrated circuit (ASIC)) to perform the steps and/or processes of the network devices 106, 304, 306, 308 described herein including those discussed with reference to FIGS. 2, 3, 4, 5, 6, 7A, 7B, 8A, 8B, 9, 18, and 19.

Figure 16:
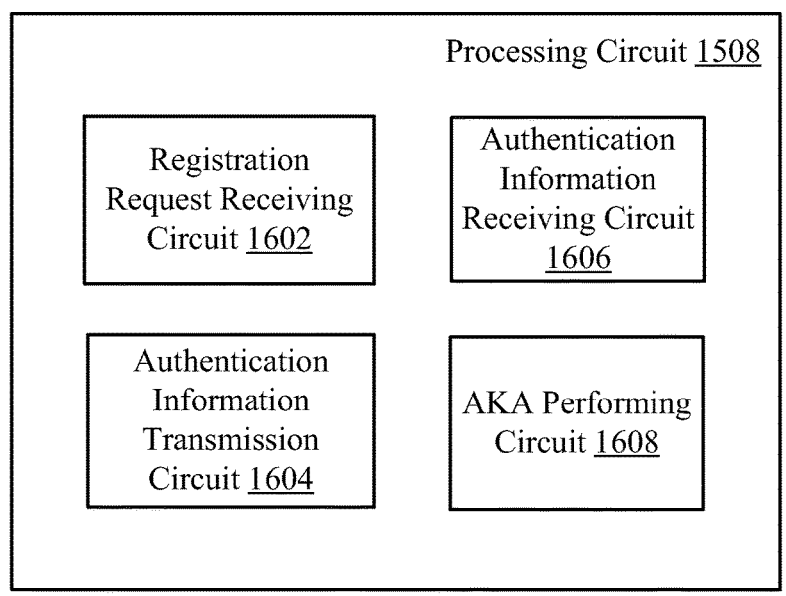
FIG. 16 illustrates a first exemplary schematic block diagram of the network device's processing circuit.

FIG. 16 illustrates a schematic block diagram of the network device processing circuit 1508 according to one aspect. The processing circuit 1508 may include a registration request receiving circuit 1602, an authentication information transmission circuit 1604, an authentication information receiving circuit 1606, and/or an authorization and key agreement (AKA) performing circuit 1608. According to one aspect, these circuits 1602, 1604, 1606, 1608 may be ASICs and are hard-wired to perform their respective processes. The registration request receiving circuit 1602 may be one example of a means for receiving, from a user device, a registration request for application-specific access to an application service provided by an application service provider. The authentication information transmission circuit 1604 may be one example of a means for transmitting an authentication information request including the registration request and a serving network identifier identifying the wireless communication network to the application service provider using a data connection through a packet data network. The authentication information receiving circuit 1606 may be one example of a means for receiving authentication information from the application service provider in response to transmitting the authentication information request. The AKA performing circuit 1608 may be one example of a means for performing authentication and key agreement with the user device based on the authentication information.

Figure 17:
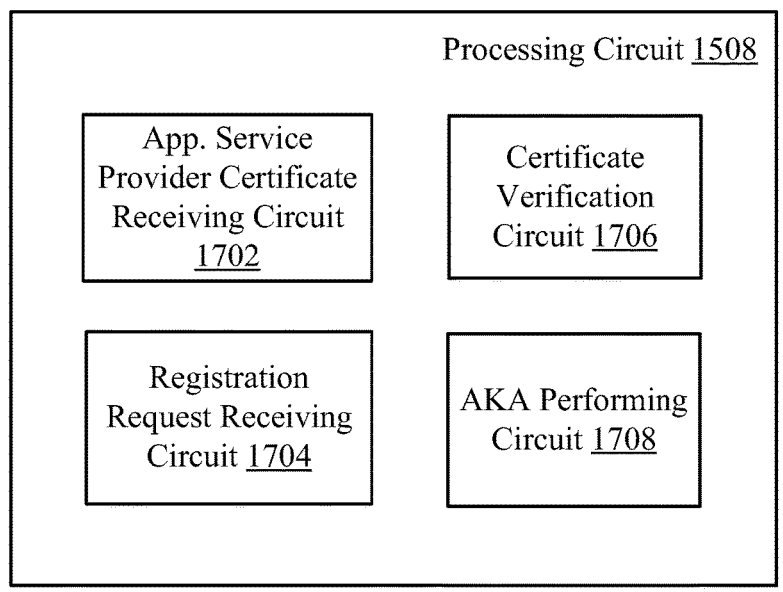
FIG. 17 illustrates a second exemplary schematic block diagram of the network device's processing circuit.

FIG. 17 illustrates a schematic block diagram of the network device processing circuit 1508 according to another aspect. The processing circuit 1508 may include an application service provider certificate receiving circuit 1702, a registration request receiving circuit 1704, a certificate verification circuit 1706, and/or an authorization and key agreement (AKA) performing circuit 1708. According to one aspect, these circuits 1702, 1704, 1706, 1708 may be ASICs and are hard-wired to perform their respective processes. The application service provider certificate receiving circuit 1702 may be one example of a means for receiving, from an application service provider, an application service provider certificate that includes an application service provider public key. The registration request receiving circuit 1704 may be one example of a means for receiving, from a user device, a registration request for application-specific access to an application service provided by an application service provider. The certificate verification circuit 1706 may be one example of a means for verifying the application-specific certificate using the application service provider public key to authenticate the user device. The AKA performing circuit 1708 may be one example of a means for performing authentication and key agreement with the user device based on the authentication information.

Figure 18:
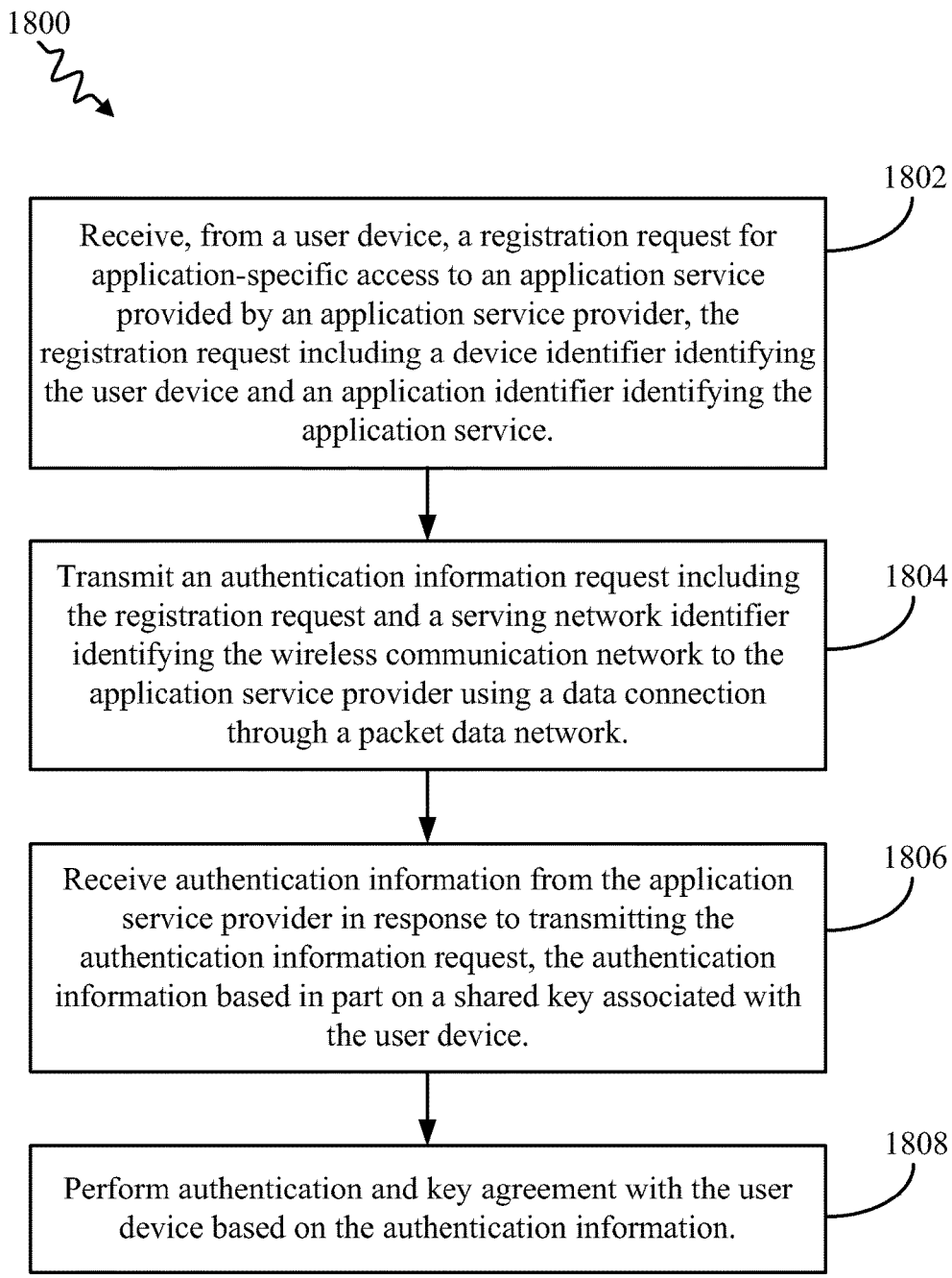
FIG. 18 illustrates a flowchart of a first exemplary method operational at a network device for providing application-specific access.

FIG. 18 illustrates a flowchart 1800 of a method operational at a wireless communication network device 1500 for providing application-specific access according to one aspect of the disclosure. First, the network device 1500 receives, from a user device 102, a registration request for application-specific access to an application service provided by an application service provider, the registration request including a device identifier identifying the user device and an application identifier identifying the application service 1802. Next, an authentication information request including the registration request and a serving network identifier identifying the wireless communication network is transmitted to the application service provider using a data connection through a packet data network 1804. Then, authentication information is received from the application service provider in response to transmitting the authentication information request, the authentication information based in part on a shared key associated with the user device 1806. Next, the network device 1500 performs authentication and key agreement with the user device 102 based on the authentication information 1808.

Figure 19:
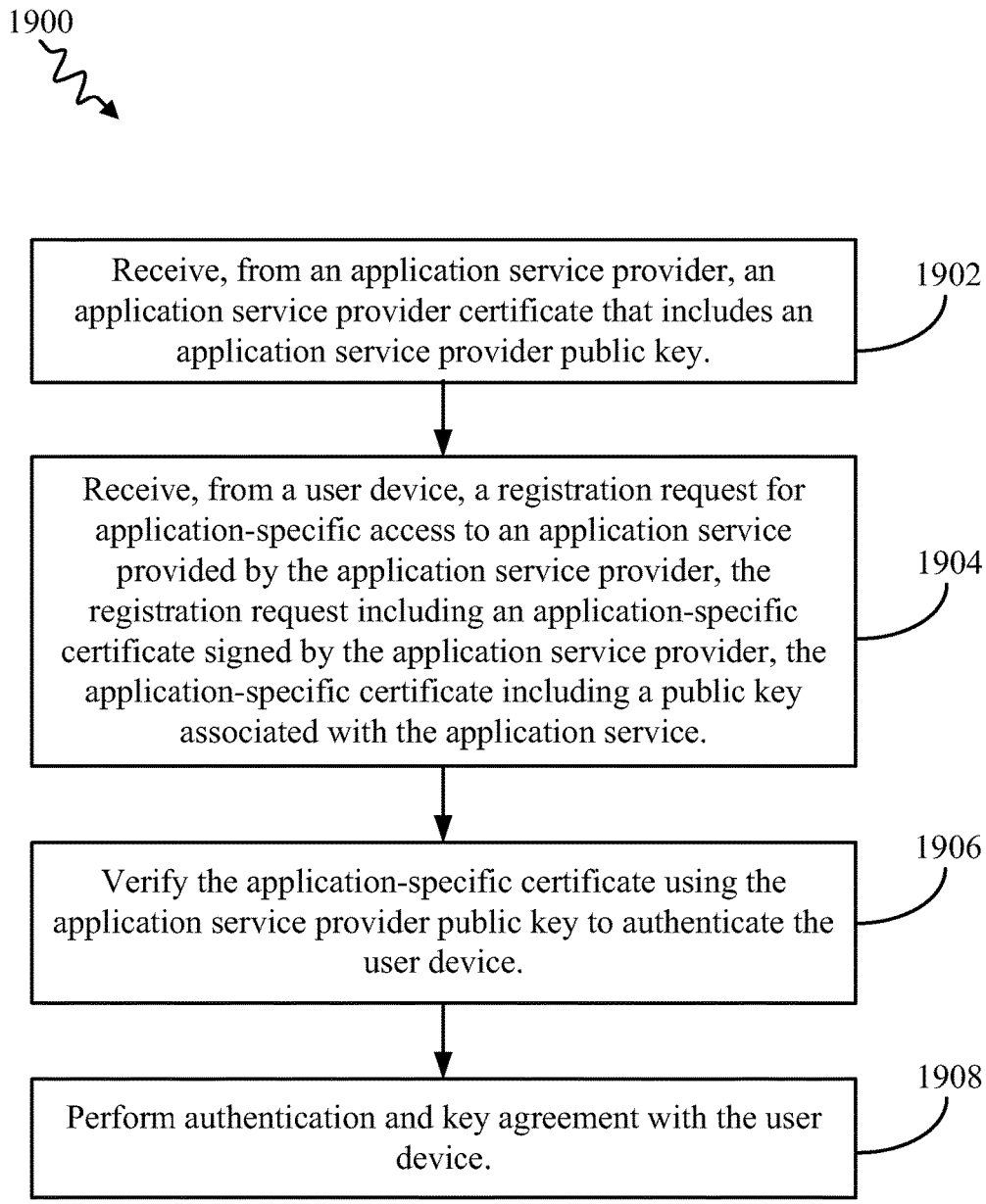
FIG. 19 illustrates a flowchart of a second exemplary method operational at a network device for providing application-specific access.

FIG. 19 illustrates a flowchart 1900 of a method operational at a wireless communication network device for providing application-specific access according to one aspect of the disclosure. First, the network device 1500 receives, from an application service provider, an application service provider certificate that includes an application service provider public key 1902. Then, the network device 1500 receives, from a user device 102, a registration request for application-specific access to an application service provided by the application service provider, the registration request including an application-specific certificate signed by the application service provider, the application-specific certificate including a public key associated with the application service 1904. Next, the network device verifies the application-specific certificate using the application service provider public key to authenticate the user device 1906. Then, the network device performs authentication and key agreement with the user device 1908.

One or more of the components, steps, features, and/or functions illustrated in FIGS. 1, 2, 3, 4, 5, 6, 7A, 7B, 8A, 8B, 9, 10 11, 12, 13, 14, 15, 16, 17, 18, and/or 19 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 3, 4, 5, 6, 10, 11, 12, 15, 16, and/or 17 may be configured to perform one or more of the methods, features, or steps described in FIGS. 2, 3, 4, 5, 6, 7A, 7B, 8A, 8B, 9, 13, 14, 18, and/or 19. The algorithms described herein may also be efficiently implemented in software and/or embedded in hardware.

Moreover, in one aspect of the disclosure, the processing circuit 1008 illustrated in FIGS. 10, 11, and/or 12 may be a specialized processor (e.g., an application specific integrated circuit (e.g., ASIC)) that is specifically designed and/or hard-wired to perform the algorithms, methods, and/or steps described in FIGS. 2, 3, 4, 5, 6, 7A, 7B, 8A, 8B, 9, 13, and/or 14. Thus, such a specialized processor (e.g., ASIC) may be one example of a means for executing the algorithms, methods, and/or steps described in FIGS. 13 and 14.

The computer-readable storage medium 1004 may also store processor 1008 readable instructions that when executed by a specialized processor (e.g., ASIC) causes the specialized processor to perform the algorithms, methods, and/or steps described in FIGS. 2, 3, 4, 5, 6, 7A, 7B, 8A, 8B, 9, 13, and/or 14.

Moreover, in one aspect of the disclosure, the processing circuit 1508 illustrated in FIGS. 15, 16, and/or 17 may be a specialized processor (e.g., an application specific integrated circuit (e.g., ASIC)) that is specifically designed and/or hard-wired to perform the algorithms, methods, and/or steps described in FIGS. 2, 3, 4, 5, 6, 7A, 7B, 8A, 8B, 9, 18, and/or 19. Thus, such a specialized processor (e.g., ASIC) may be one example of a means for executing the algorithms, methods, and/or steps described in FIGS. 18 and 19. The computer-readable storage medium 1504 may also store processor 1508 readable instructions that when executed by a specialized processor (e.g., ASIC) causes the specialized processor to perform the algorithms, methods, and/or steps described in FIGS. 2, 3, 4, 5, 6, 7A, 7B, 8A, 8B, 9, 18, and/or 19.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a user device, the method comprising:
   receiving and storing, at a memory circuit, a shared key from an application service provider;
   determining, at a processing circuit, that a wireless wide area communication network provides application-specific access to an application service provided by the application service provider;
   transmitting, via a wireless communication interface, a registration request, which includes a device identifier and an application identifier associated with the application service, to the application service provider using a data connection through a packet data network of the wireless wide area communication network that bypasses authentication by at least one of a home subscriber service (HSS) and/or authentication authorization accounting (AAA) of the wireless wide area communication network;

receiving, from the wireless wide area communication network, authentication information derived at the application service provider that is based in part on the shared key, the authentication information received via the wireless communication interface;

performing, at the processing circuit, authentication and key agreement with the wireless wide area communication network based on the authentication information and the stored shared key; and communicating, via the wireless communication interface, with the application service after authentication and key agreement is successfully performed.

2. The method of claim 1, wherein the shared key is uniquely associated with the user device.

3. The method of claim 1, wherein the shared key is received from the application service provider over a secure out of band connection that is independent to communication channels established with the wireless wide area communication network.

4. The method of claim 1, further comprising:
enabling communication between the user device and a set of application services allowed by the application service provider after authentication and key agreement is successfully performed.

5. The method of claim 1, further comprising:
receiving and storing the device identifier from the application service provider before transmitting the registration request.

6. The method of claim 1, further comprising:
receiving the application identifier from the application service provider before transmitting the registration request to the wireless wide area communication network.

7. The method of claim 1, further comprising:
receiving the application identifier from the wireless wide area communication network via an application service announcement before transmitting the registration request to the wireless wide area communication network.

8. The method of claim 1, wherein the application identifier is at least one of a fully qualified domain name, a uniform resource locator, and/or a uniform resource identifier.

9. The method of claim 1, wherein application-specific access is granted to the user device independent to any subscriber identity module associated with the user device.

10. A user device comprising:
a wireless communication interface adapted to wirelessly communicate with a wireless wide area communication network;
a memory circuit; and
a processing circuit communicatively coupled to the memory circuit and the wireless communication interface, the processing circuit adapted to:
receive and store a shared key from an application service provider;
determine that a wireless wide area communication network provides application-specific access to an application service provided by the application service provider;
transmit a registration request, which includes a device identifier and an application identifier associated with the application service, to the application service provider using a data connection through a packet data network of the wireless wide area communication network that bypasses authentication by at least one of a home subscriber service (HSS) and/or authentication authorization accounting (AAA) of the wireless wide area communication network;
receive, from the wireless wide area communication network, authentication information derived at the application service provider that is based in part on the shared key;
perform authentication and key agreement with the wireless wide area communication network based on the authentication information and the stored shared key; and
communicate with the application service after authentication and key agreement is successfully performed.

11. The user device of claim 10, wherein the shared key is uniquely associated with the user device.

12. The user device of claim 10, wherein the shared key is received from the application service provider over a secure out of band connection that is independent to communication channels established with the wireless wide area communication network.

13. The user device of claim 10, wherein the processing circuit is further adapted to:
enable communication between the user device and a set of application services allowed by the application service provider after authentication and key agreement is successfully performed.

14. The user device of claim 10, wherein the processing circuit is further adapted to:
receive the device identifier from the application service provider before transmitting the registration request.

15. The user device of claim 10, wherein the processing circuit is further adapted to:
receive the application identifier from the application service provider before transmitting the registration request to the wireless wide area communication network.

16. The user device of claim 10, wherein the processing circuit is further adapted to:
receive the application identifier from the wireless wide area communication network via an application service announcement before transmitting the registration request to the wireless wide area communication network.

17. The user device of claim 10, wherein the application identifier is at least one of a fully qualified domain name, a uniform resource locator, and/or a uniform resource identifier.

18. The user device of claim 10, wherein application-specific access is granted to the user device independent to any subscriber identity module associated with the user device.

19. A user device comprising:
means for receiving and storing a shared key from an application service provider;

means for determining that a wireless wide area communication network provides application-specific access to an application service provided by the application service provider;
means for transmitting a registration request, which includes a device identifier and an application identifier associated with the application service, to the application service provider using a data connection through a packet data network of the wireless wide area communication network that bypasses authentication by at least one of a home subscriber service (HSS) and/or authentication authorization accounting (AAA) of the wireless wide area communication network;
means for receiving, from the wireless wide area communication network, authentication information derived at the application service provider that is based in part on the shared key;
means for performing authentication and key agreement with the wireless wide area communication network based on the authentication information and the stored shared key; and
means for communicating with the application service after authentication and key agreement is successfully performed.

20. The user device of claim 19, wherein the shared key is uniquely associated with the user device.

21. The user device of claim 19, further comprising:
means for receiving the application identifier from the application service provider before transmitting the registration request to the wireless wide area communication network.

22. The user device of claim 19, further comprising:
means for receiving the application identifier from the wireless wide area communication network via an application service announcement before transmitting the registration request to the wireless wide area communication network.

23. A method operational at a wireless communication network device associated with a wireless wide area communication network, the method comprising:
receiving via a communication interface, from a user device, a registration request for application-specific access to an application service provided by an application service provider, the registration request including a device identifier identifying the user device and an application identifier identifying the application service;
transmitting, via the communication interface, an authentication information request including the registration request and a serving network identifier identifying the wireless wide area communication network to the application service provider using a data connection through a packet data network of the wireless wide area communication network that bypasses authentication of the user device by at least one of a home subscriber service (HSS) and/or authentication authorization accounting (AAA) of the wireless wide area communication network;
receiving, via the communication interface, authentication information from the application service provider in response to transmitting the authentication information request, the authentication information based in part on a shared key associated with the user device; and
performing, at a processing circuit, authentication and key agreement with the user device based on the authentication information.

24. The method of claim 23, further comprising:
receiving application service registration information associated with the application service before receiving the registration request from the user device.

25. The method of claim 24, wherein the application service registration information is received from the application service provider via a service provisioning function.

26. The method of claim 24, wherein the application service registration information includes at least one of the application identifier and/or application service class indicating a quality of service the wireless wide area communication network provides for communications between the user device and the application service.

27. The method of claim 23, further comprising:
broadcasting an announcement that indicates availability of application-specific access to the application service through the wireless wide area communication network.

28. The method of claim 27, wherein the announcement includes the application identifier.

29. The method of claim 23, wherein the authentication information includes an authentication vector comprising a key access security management entity (K_ASME), an authentication token (AUTN), a random number (RAND), and an expected response (XRES), and performing authentication and key agreement with the user device based on the authentication information includes:
storing K_ASME and XRES at the wireless communication network device;
transmitting RAND and AUTN to the user device;
receiving a response value (RES) from the user device; and
verifying that RES equals XRES to authenticate the user device.

30. The method of claim 23, further comprising:
providing application-specific access to the user device for the application service after authentication and key agreement is successful.

31. The method of claim 23, further comprising:
enabling communication between the user device and a set of application services allowed by the application service provider after authentication and key agreement is successful.

32. A wireless communication network device associated with a wireless wide area communication network, the wireless communication network device comprising:
a wireless communication interface adapted to wirelessly communicate with at least a user device; and
a processing circuit communicatively coupled to the wireless communication interface, the processing circuit adapted to:
receive, from the user device, a registration request for application-specific access to an application service provided by an application service provider, the registration request including a device identifier identifying the user device and an application identifier identifying the application service;
transmit an authentication information request including the registration request and a serving network identifier identifying the wireless wide area communication network to the application service provider using a data connection through a packet data network of the wireless wide area communication network that bypasses authentication of the user device by at least one of a home subscriber service (HSS)

and/or authentication authorization accounting (AAA) of the wireless wide area communication network;

receive authentication information from the application service provider in response to transmitting the authentication information request, the authentication information based in part on a shared key associated with the user device; and perform authentication and key agreement with the user device based on the authentication information.

33. The wireless communication network device of claim 32, wherein the processing circuit is further adapted to:
receive application service registration information associated with the application service before receiving the registration request from the user device.

34. The wireless communication network device of claim 33, wherein the application service registration information is received from the application service provider via a service provisioning function.

35. The wireless communication network device of claim 33, wherein the application service registration information includes at least one of the application identifier and/or application service class indicating a quality of service the wireless wide area communication network provides for communications between the user device and the application service.

36. The wireless communication network device of claim 32, wherein the processing circuit is further adapted to:
broadcast an announcement that indicates availability of application-specific access to the application service through the wireless wide area communication network.

37. The wireless communication network device of claim 36, wherein the announcement includes the application identifier.

38. The wireless communication network device of claim 32, wherein the authentication information includes an authentication vector comprising a key access security management entity (K_ASME), an authentication token (AUTN), a random number (RAND), and an expected response (XRES), and the processing circuit adapted to perform authentication and key agreement with the user device based on the authentication information includes the processing circuit further adapted to:
store K_ASME and XRES at the wireless communication network device;
transmit RAND and AUTN to the user device;
receive a response value (RES) from the user device; and
verify that RES equals XRES to authenticate the user device.

39. The wireless communication network device of claim 32, wherein the processing circuit is further adapted to:
provide application-specific access to the user device for the application service after authentication and key agreement is successful.

40. The wireless communication network device of claim 32, wherein the processing circuit is further adapted to:
enable communication between the user device and a set of application services allowed by the application service provider after authentication and key agreement is successful.

41. A wireless communication network device associated with a wireless wide area communication network, the wireless communication network device comprising:
means for receiving, from a user device, a registration request for application-specific access to an application service provided by an application service provider, the registration request including a device identifier identifying the user device and an application identifier identifying the application service;
means for transmitting an authentication information request including the registration request and a serving network identifier identifying the wireless wide area communication network to the application service provider using a data connection through a packet data network of the wireless wide area communication network that bypasses authentication of the user device by at least one of a home subscriber service (HSS) and/or authentication authorization accounting (AAA) of the wireless wide area communication network;
means for receiving authentication information from the application service provider in response to transmitting the authentication information request, the authentication information based in part on a shared key associated with the user device; and
means for performing authentication and key agreement with the user device based on the authentication information.

42. The wireless communication network device of claim 41, further comprising:
receiving application service registration information associated with the application service before receiving the registration request from the user device.

43. The wireless communication network device of claim 41, further comprising:
broadcasting an announcement that indicates availability of application-specific access to the application service through the wireless wide area communication network.

44. The wireless communication network device of claim 41, further comprising:
enabling communication between the user device and a set of application services allowed by the application service provider after authentication and key agreement is successful.

* * * * *